(12) United States Patent
Lee

(10) Patent No.: US 10,331,199 B2
(45) Date of Patent: Jun. 25, 2019

(54) SYSTEM AND METHOD FOR INSERTION AND REMOVAL DETECTION OF EXTERNAL STORAGE MEDIA

(71) Applicant: Samsung Electronics Co., Ltd, Gyeonggi-do (KR)

(72) Inventor: Won-Wook Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 15/436,698

(22) Filed: Feb. 17, 2017

(65) Prior Publication Data

US 2017/0242474 A1    Aug. 24, 2017

(30) Foreign Application Priority Data

Feb. 19, 2016    (KR) ........................ 10-2016-0020016

(51) Int. Cl.
  *G06F 1/00*        (2006.01)
  *G06F 1/3287*      (2019.01)
  (Continued)

(52) U.S. Cl.
  CPC .............. *G06F 1/3287* (2013.01); *G05F 3/02* (2013.01); *G06F 1/1658* (2013.01); *G06F 1/266* (2013.01);
  (Continued)

(58) Field of Classification Search
  None
  See application file for complete search history.

(56) References Cited

U.S. PATENT DOCUMENTS

| 9,203,458 B2 | 12/2015 | Sutherland et al. |
| 2003/0153356 A1* | 8/2003 | Liu ...................... H04B 1/3816 455/558 |

(Continued)

FOREIGN PATENT DOCUMENTS

| EP | 1630727 A2 | 3/2006 |
| EP | 2858182 A1 | 4/2015 |

(Continued)

OTHER PUBLICATIONS

Foreign Communication From a Related Counterpart Application, PCT Application No. PCT/KR2017/000775, International Search Report dated May 4, 2017, 3 pages.

(Continued)

*Primary Examiner* — Nitin C Patel

(57) ABSTRACT

An electronic device includes a tray comprising a first external storage medium and a second external storage medium, a connection circuit comprising a plurality of first contacts configured to be electrically connected to the first external storage medium and a plurality of second contacts configured to be electrically connected to the second external storage medium when the tray is attached to the electronic device, a power management circuit configured to be electrically connected to at least one part of the connection circuit, a detector configured to detect that the tray is moved to be attached to or detached from the electronic device, and a processor electrically connected to the detector and the power management circuit, wherein the processor is configured to adjust the power management circuit to control power provided to at least one part of the plurality of first contacts or second contacts when the tray is moved to be attached to or detached from the electronic device.

19 Claims, 26 Drawing Sheets

(51) Int. Cl.
  *G05F 3/02* (2006.01)
  *G06F 1/26* (2006.01)
  *G06F 1/3296* (2019.01)
  *G06F 1/16* (2006.01)
  *H04B 1/3816* (2015.01)
  *G06K 7/00* (2006.01)
  *H04W 52/02* (2009.01)

(52) U.S. Cl.
  CPC ......... *G06F 1/3296* (2013.01); *G06K 7/0013* (2013.01); *G06K 7/0052* (2013.01); *H04B 1/3816* (2013.01); *H04W 52/0261* (2013.01)

(56) References Cited

U.S. PATENT DOCUMENTS

| | | | | |
|---|---|---|---|---|
| 2009/0039708 A1* | 2/2009 | Zanders | ........... | H02J 9/005 307/70 |
| 2009/0156258 A1 | 6/2009 | Yang | | |
| 2013/0102170 A1 | 4/2013 | Yang et al. | | |
| 2013/0205579 A1* | 8/2013 | Mather | ........... | H04Q 1/138 29/593 |
| 2013/0290651 A1* | 10/2013 | Kawamata | ........... | G06F 12/00 711/154 |
| 2014/0101466 A1 | 4/2014 | Itakura | | |
| 2014/0104767 A1 | 4/2014 | Sutherland et al. | | |
| 2014/0113495 A1 | 4/2014 | Lim et al. | | |
| 2016/0028172 A1 | 1/2016 | Motohashi et al. | | |

FOREIGN PATENT DOCUMENTS

| | | |
|---|---|---|
| KR | 1020050089577 | 9/2005 |
| KR | 20140143723 A | 12/2014 |
| KR | 20150053004 A | 5/2015 |

OTHER PUBLICATIONS

Foreign Communication From a Related Counterpart Application, PCT Application No. PCT/KR2017/000775, Written Opinion dated May 4, 2017, 6 pages.
European Patent Office, "Supplementary European Search Report," Application No. EP17753385.8, dated Feb. 27, 2019, 8 pages.

* cited by examiner

SYSTEM AND METHOD FOR INSERTION AND REMOVAL DETECTION OF EXTERNAL STORAGE MEDIA

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Feb. 19, 2016 and assigned Serial No. 10-2016-0020016, the entire disclosure of which is hereby incorporated by reference.

TECHNICAL FIELD

Various embodiments of the present disclosure relate to an electronic device capable of attaching an external storage medium, and more particularly, to an electronic device capable of simultaneously attaching a plurality of external storage media.

BACKGROUND

In general, a portable digital device such as a digital camera, a digital camcorder, and a smart phone, may store content (e.g., photos, video, music, etc.) in a storage medium. Optionally, the device stores the content in an embedded storage space. Mostly, however, an external storage medium is used as a small-sized detachable storage medium. The external storage medium may be used to conveniently move/cope the content to another device, and may be replaced with an external storage medium having great capacity to store a great amount of content.

When it is intended to simultaneously use a plurality of external storage media in an electronic device, the plurality of external storage media may be attached to respective holders prepared at different locations of a user device. It may be difficult to make the user device have a small size due to the plurality of holders. Further, a user may feel inconvenience when the plurality of holders are attached to the respective external storage media one-by-one.

SUMMARY

To address the above-discussed deficiencies, it is a primary object to provide an electronic device attachable a plurality of external storage media at once, and an plug-in apparatus for mounting the plurality of external storage media.

Various embodiments of the present disclose can reduce an amount of or prevent a data loss of at least one external storage medium even if at least one data-related contact of the at least one external storage medium is contacted with at least one power-related contact of the electronic device when an apparatus including the plurality of external storage medium is moved to be attached to or detached from the electronic device.

According to an embodiment of the present disclosure, an electronic device may include a tray comprising a first external storage medium and a second external storage medium, a connection circuit comprising a plurality of first contacts configured to be electrically connected to the first external storage medium and a plurality of second contacts configured to be electrically connected to the second external storage medium when the tray is attached to the electronic device, a power management circuit configured to be electrically connected to at least one part of the connection circuit, a detector configured to detect that the tray is moved to be attached to or detached from the electronic device, and a processor electrically connected to the detector and the power management circuit, wherein the processor is configured to adjust the power management circuit to control power provided to at least one part of the plurality of first contacts or second contacts when the tray is moved to be attached to or detached from the electronic device.

According to various embodiments of the present disclosure, a plurality of external storage media is attachable at once to an electronic device, thereby improving usability when the external storage medium is attached.

When the external storage medium is moved to be attached to the electronic device or to be detached from the electronic device, the external storage medium may be electrically connected to a power-related contact for a different external storage medium placed on the movement. According to various embodiments of the present disclosure, when the external storage medium is attached or detached, power supplied to the power-related contact for the different external storage medium placed on the movement may be cut off to prevent unintended power from being supplied to the external storage medium, thereby preventing a data loss or a fault occurrence in the external storage medium.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
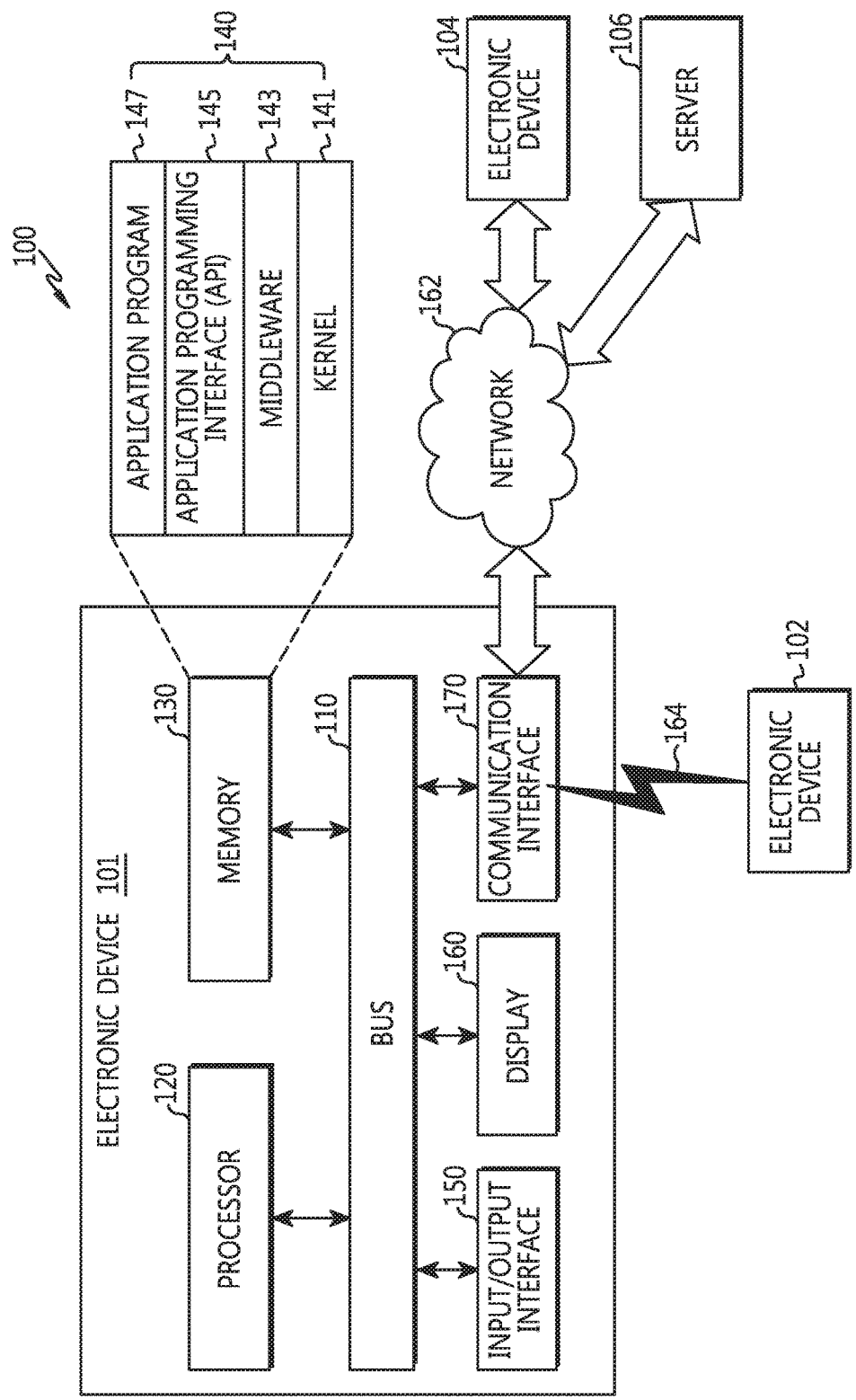
FIG. 1 briefly illustrates an electronic device in a network environment according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present document are described with reference to the accompanying drawings. It should be understood, however, that it is not intended to limit the embodiments of the present document to the particular form disclosed, but, on the contrary, it is intended to cover all modifications, equivalents, and alternatives falling within the spirit and scope of the embodiments of the present document. Like reference numerals denote like constitutional elements throughout the drawings.

An expression "have", "may have", "include" or "may include" or the like used in the present document is intended to indicate a presence of a corresponding characteristic (e.g., a number, a function, an operation, or a constitutional element such as a component), and should be understood that there are additional possibilities of one or more other characteristics.

In the present document, an expression "A or B", "A and/or B", or "one or more of A and/or B" or the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Although expressions such as "$1^{st}$", "$2^{nd}$" "first", and "second" may be used in the present document to express various constitutional elements, it is not intended to limit the corresponding constitutional elements. The above expressions may be used to distinguish one constitutional element from another constitutional element. For example, a first user device and a second user device are both user devices, and may indicate different user devices. For example, a first constitutional element may be termed a second constitutional element, and similarly, the second constitutional element may be termed the first constitutional element without departing from the scope of the present document.

When a certain constitutional element (e.g., the first constitutional element) is mentioned as being "operatively or communicatively coupled with/to" or "connected to" a different constitutional element (e.g., the second constitutional element), it is to be understood that the certain constitutional element is directly coupled with/to another constitutional element or can be coupled with/to the different constitutional element via another constitutional element (e.g., a third constitutional element). On the other hand, when the certain constitutional element (e.g., the first constitutional element) is mentioned as being "directly coupled with/to" or "directly connected to" the different constitutional element (e.g., the second constitutional element), it may be understood that another constitutional element (e.g., the third constitutional element) is not present between the certain constitutional element and the different constitutional element.

An expression "configured to" used in the present document may be interchangeably used with, for example, "suitable for", "having the capacity to", "designed to", "adapted to", "made to", or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

Terms used in the present document are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the present document. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present document should not be interpreted to exclude the embodiments of the present document.

An electronic device according to various embodiments of the present document may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device. According to various embodiments, the wearable device may include at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit).

According to certain embodiments, the electronic device may be a home appliance. The home appliance may include, for example, at least one of a TeleVision (TV), a Digital Video Disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync®, Apple TV®, or Google TV®), a game console (e.g., Xbox®, PlayStation®), an electronic dictionary, an electronic key, a camcorder, and an electronic picture frame.

According to other embodiments, the electronic device may include at least one of various medical devices (e.g., various portable medical measuring devices (e.g., a blood sugar measuring device, a hear rate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Positioning System (GPS) receiver, an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.).

According to certain embodiments, the electronic device may include at least one of furniture or a part of buildings/constructions, an electronic board, an electronic signature input device, a projector, and various measurement machines (e.g., water supply, electricity, gas, propagation measurement machine, etc.). In various embodiments, the electronic device may be one or more combinations of the aforementioned various devices. According to certain embodiments, the electronic device may be a flexible device. Further, the electronic device according to one embodiment of the present document is not limited to the aforementioned devices, and may include a new electronic device depending on technical progress.

Hereinafter, an electronic device according to various embodiments will be described with reference to the accompanying drawings. The term "user" used in the present document may refer to a person who uses the electronic device or a device which uses the electronic device (e.g., an Artificial Intelligence (AI) electronic device).

Referring to FIG. 1, an electronic device 101 in a network environment 100 is disclosed according to various embodiments. The electronic device 101 may include a bus 110, a processor 120, a memory 130, an input/output interface 150, a display 160, and a communication interface 170. In a certain embodiment, the electronic device 101 may omit at least one of the aforementioned constitutional elements or may additionally include other constitutional elements.

The bus 110 may include a circuit for connecting the aforementioned constitutional elements 120 to 170 to each other and for delivering communication (e.g., a control message and/or data) between the aforementioned constitutional elements.

The processor 120 may include one or more of a Central Processing Unit (CPU), an Application Processor (AP), and a Communication Processor (CP). The processor 120 may control, for example, at least one of other constitutional elements of the electronic device 101 and/or may execute an arithmetic operation or data processing for communication.

The memory 130 may include a volatile and/or non-volatile memory. The memory 130 may store, for example, an instruction or data related to at least one different constitutional element of the electronic device 101. According to one embodiment, the memory 130 may store a software and/or a program 140. The program 140 may include, for example, a kernel 141, a middleware 143, an Application Programming Interface (API) 145, and/or an application program (or an "application") 147, or the like. At least one part of the kernel 141, middleware 143, or API 145 may be referred to as an Operating System (OS).

The kernel 141 may control or manage, for example, system resources (e.g., the bus 110, the processor 120, the memory 130, etc.) used to execute an operation or function implemented in other programs (e.g., the middleware 143, the API 145, or the application program 147). Further, the kernel 141 may provide an interface capable of controlling or managing the system resources by accessing individual constitutional elements of the electronic device 101 in the middleware 143, the API 145, or the application program 147.

The middleware 143 may perform, for example, a mediation role so that the API 145 or the application program 147 can communicate with the kernel 141 to exchange data.

Further, the middleware 143 may handle one or more task requests received from the application program 147 according to a priority. For example, the middleware 143 may assign a priority of using the system resources (e.g., the bus 110, the processor 120, or the memory 130) of the electronic device 101 to at least one of the application programs 147. For instance, the middleware 143 may process the one or more task requests according to the priority assigned to the at least one of the application programs, and thus may perform scheduling or load balancing on the one or more task requests.

The API 145 may include at least one interface or function (e.g., instruction), for example, for file control, window control, video processing, or character control, as an interface capable of controlling a function provided by the application 147 in the kernel 141 or the middleware 143.

For example, the input/output interface 150 may play a role of an interface for delivering an instruction or data input from a user or a different external device(s) to the different constitutional elements of the electronic device 101. Further, the input/output interface 150 may output an instruction or data received from the different constitutional element(s) of the electronic device 101 to the different external device.

The display 160 may include various types of displays, for example, a Liquid Crystal Display (LCD) display, a Light Emitting Diode (LED) display, an Organic Light-Emitting Diode (OLED) display, a MicroElectroMechanical Systems (MEMS) display, or an electronic paper display. The display 160 may display, for example, a variety of contents (e.g., text, image, video, icon, symbol, etc.) to the user. The display 160 may include a touch screen. For example, the display 160 may receive a touch, gesture, proximity, or hovering input by using a stylus pen or a part of a user's body.

The communication interface 170 may establish, for example, communication between the electronic device 101 and the external device (e.g., a first external electronic device 102, a second external electronic device 104, or a server 106). For example, the communication interface 170 may communicate with the external device (e.g., the second external electronic device 104 or the server 106) by being connected with a network 162 through wireless communication or wired communication.

For example, as a cellular communication protocol, the wireless communication may use at least one of Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like. Further, the wireless communication may include, for example, a near-distance communication 164. The near-distance communication 164 may include, for example, at least one of Wireless Fidelity (WiFi), Bluetooth®, Near Field Communication (NFC), Global Navigation Satellite System (GNSS), and the like. According to a usage region or a bandwidth or the like, the GNSS may include, for example, at least one of Global Positioning System (GPS), Global Navigation Satellite System (Glonass®), Beidou® Navigation Satellite System (hereinafter, "Beidou"), Galileo®, the European global satellite-based navigation system, and the like. Hereinafter, the "GPS" and the "GNSS" may be used interchangeably in the present document. The wired communication may include, for example, at least one of Universal Serial Bus (USB), High Definition Multimedia Interface (HDMI), Recommended Standard-232 (RS-232), power-line communication, Plain Old Telephone Service (POTS), and the like. The network 162 may include, for example, at least one of a telecommunications network, a computer network (e.g., LAN or WAN), the Internet, and a telephone network.

Each of the first and second external electronic devices 102 and 104 may be the same type or different type of the electronic device 101. According to one embodiment, the server 106 may include a group of one or more servers. According to various embodiments, all or some of operations executed by the electronic device 101 may be executed in a different one or a plurality of electronic devices (e.g., the electronic device 102 or 104 or the server 106). According to one embodiment, if the electronic device 101 needs to perform a certain function or service either automatically or at a request, the electronic device 101 may request at least a part of functions related thereto alternatively or additionally to a different electronic device (e.g., the electronic device 102 or 104 or the server 106) instead of executing the function or the service autonomously. The different electronic device (e.g., the electronic device 102 or 104 or the server 106) may execute the requested function or additional function, and may deliver a result thereof to the electronic device 101. The electronic device 101 may provide the requested function or service either directly or by additionally processing the received result. For this, for example, a cloud computing, distributed computing, or client-server computing technique may be used.

Figure 2:
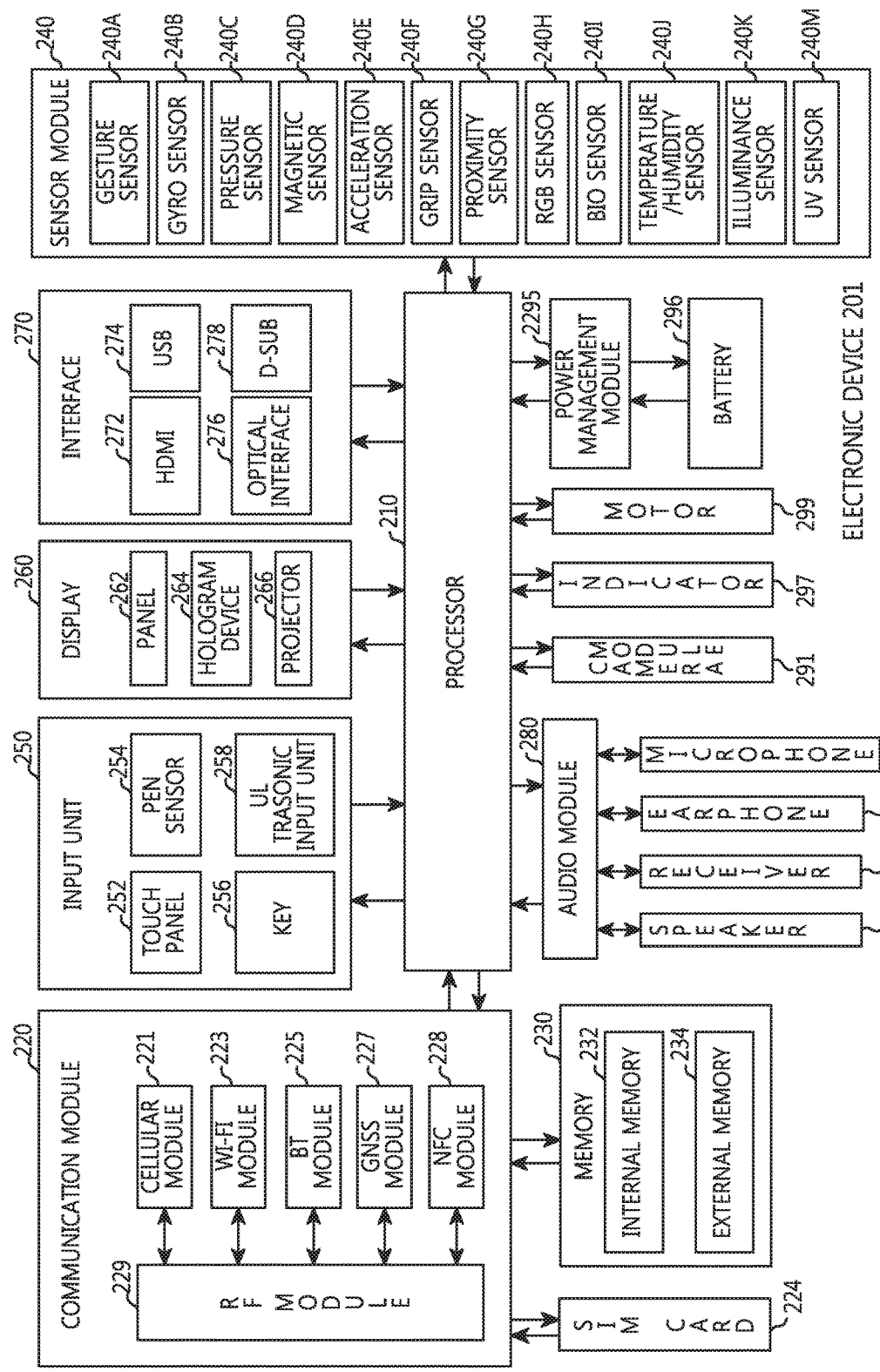
FIG. 2 is a block diagram of an electronic device according to various embodiments of the present disclosure.

FIG. 2 is a block diagram of an electronic device 201 according to various embodiments. The electronic device 201 may include, for example, all or some parts of the electronic device 101 of FIG. 1. The electronic device 201 may include one or more processors (e.g., Application Processors (APs)) 210, a communication module 220, a subscriber identity module 224, a memory 230, a sensor module 240, an input unit 250, a display 260, an interface 270, an audio module 280, a camera module 291, a power management module 295, a battery 296, an indicator 297, and a motor 298.

The processor 210 may control a plurality of hardware or software constitutional elements connected to the processor 210 by driving, for example, an operating system or an application program, and may process a variety of data including multimedia data and may perform an arithmetic operation. The processor 210 may be implemented, for example, with a System on Chip (SoC). According to one embodiment, the processor 210 may further include a Graphic Processing Unit (GPU) and/or an image signal processor. The processor 210 may include at least one part (e.g., a cellular module 221) of the aforementioned constitutional elements of FIG. 2. The processor 210 may process an instruction or data, which is received from at least one of different constitutional elements (e.g., a non-volatile memory), by loading it to a volatile memory and may store a variety of data in the non-volatile memory.

The communication module 220 may have the same or similar configuration of the communication interface 170 of FIG. 1. The communication module 220 may include, for example, the cellular module 221, a Wi-Fi module 223, a BlueTooth® (BT) module 225, a GNSS module 227 (e.g., a GPS module, a Glonass® module, a Beidou® module, or a Galileo® module), a Near Field Communication (NFC) module 228, and a Radio Frequency (RF) module 229.

The cellular module 221 may provide a voice call, a video call, a text service, an Internet service, or the like, for example, through a communication network. According to one embodiment, the cellular module 221 may identify and authenticate the electronic device 201 in the communication network by using the subscriber identity module (e.g., a Subscriber Identity Module (SIM) card) 224. According to one embodiment, the cellular module 221 may perform at least some functions that can be provided by the processor 210. According to one embodiment, the cellular module 221 may include a Communication Processor (CP).

Each of the WiFi module 223, the Bluetooth® module 225, the GNSS module 227, and the NFC module 228 may include, for example, a processor for processing data transmitted/received through a corresponding module. According to a certain embodiment, at least some (e.g., two or more) of the cellular module 221, the WiFi module 223, the BT module 225, the GPS module 227, and the NFC module 228 may be included in one Integrated Chip (IC) or IC package.

The RF module 229 may transmit/receive, for example, a communication signal (e.g., a Radio Frequency (RF) signal). The RF module 229 may include, for example, a transceiver, a Power Amp Module (PAM), a frequency filter, a Low Noise Amplifier (LNA), an antenna, or the like. According to another embodiment, at least one of the cellular module 221, the WiFi module 223, the BT module 225, the GPS module 227, and the NFC module 228 may transmit/receive an RF signal via a separate RF module.

The subscriber identity module 224 may include, for example, a card including the subscriber identity module and/or an embedded SIM, and may include unique identification information (e.g., an Integrated Circuit Card IDentifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)).

The external memory 234 may further include a flash drive, for example, Compact Flash (CF), Secure Digital (SD), Micro Secure Digital (Micro-SD), Mini Secure digital (Mini-SD), extreme Digital (xD), memory stick, or the like. The external memory 234 may be operatively and/or physically connected to the electronic device 201 via various interfaces.

According to one embodiment, the electronic device 201 may include a socket (or a connector) capable of attaching a plurality of external memories at once. For example, the plurality of external memories may be attached to a tray. If the socket is attached to the tray to which the plurality of external memories is attached, the plurality of external memories may be electrically connected to a plurality of contacts included in the socket.

According to one embodiment, the plurality of external memories may be arranged in a row in a direction in which the tray is attached to the socket.

The sensor module 240 may measure, for example, physical quantity or detect an operational status of the electronic device 201, and may convert the measured or detected information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternatively, the sensor module 240 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 240 may further include a control circuit for controlling at least one or more sensors included therein. In a certain embodiment, the electronic device 201 may further include a processor configured to control the sensor module 204 either separately or as one part of the processor 210, and may control the sensor module 240 while the processor 210 is in a sleep state.

According to one embodiment, at least one part of the sensor module 240 may detect that at least one external storage medium is attached to the electronic device 201 or is detached from the electronic device 201.

According to one embodiment, at least one part of the sensor module 240 may detect that the tray to which the plurality of external storage media are attached is attached to the electronic device 201 or is detached from the electronic device 201.

The input unit 250 may include, for example, a touch panel 252, a (digital) pen sensor 254, a key 256, or an ultrasonic input device 258. The touch panel 252 may recognize a touch input, for example, by using at least one of an electrostatic type, a pressure-sensitive type, and an ultrasonic type. In addition, the touch panel 252 may further include a control circuit. The touch penal 252 may further include a tactile layer and thus may provide the user with a tactile reaction.

The (digital) pen sensor 254 may be, for example, one part of a touch panel, or may include an additional sheet for recognition. The key 256 may be, for example, a physical button, an optical key, a keypad, or a touch key. The ultrasonic input device 258 may detect an ultrasonic wave generated from an input means through a microphone (e.g., a microphone 288) to confirm data corresponding to the detected ultrasonic wave.

The display 260 (e.g., the display 160) may include a panel 262, a hologram unit 264, or a projector 266. The panel 262 may include the same or similar structure of the display 160 of FIG. 1. The panel 262 may be implemented, for example, in a flexible, transparent, or wearable manner. The panel 262 may be constructed as one module with the touch panel 252. The hologram unit 264 may use an interference of light and show a stereoscopic image in the air. The projector 266 may display an image by projecting a light beam onto a screen. The screen may be located, for example, inside or outside the electronic device 201. According to one embodiment, the display 260 may further include a control circuit for controlling the panel 262, the hologram unit 264, or the projector 266.

The interface 270 may include, for example, a High-Definition Multimedia Interface (HDMI) 272, a Universal Serial Bus (USB) 274, an optical communication interface 276, or a D-subminiature (D-sub) 278. The interface 270 may be included, for example, in the communication interface 170 of FIG. 1. Additionally or alternatively, the interface 270 may include, for example, a Mobile High-definition Link (MHL) interface, a Secure Digital (SD)/Multi-Media Card (MMC) interface, or an Infrared Data Association (IrDA) standard interface.

The audio module 280 may bilaterally convert, for example, a sound and electric signal. At least some constitutional elements of the audio module 280 may be included in, for example, the input/output interface 150 of FIG. 1. The audio module 280 may convert sound information which is input or output, for example, through a speaker 282, a receiver 284, an earphone 286, the microphone 288, or the like.

The camera module 291 is, for example, a device for image and video capturing, and according to one embodiment, may include one or more image sensors (e.g., a front sensor or a rear sensor), a lens, an Image Signal Processor (ISP), or a flash (e.g., LED or xenon lamp).

The power management module 295 may manage, for example, power of the electronic device 201. According to one embodiment, the power management module 295 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 296 and voltage, current, and temperature during charging. The battery 296 may include, for example, a rechargeable battery and/or a solar battery.

When the external storage medium is moved to be attached to the electronic device or to be detached from the electronic device, the external storage medium may be physically in contact with at least one different contact (e.g., a contact for a different external storage medium or a contact for various constitutional elements) placed on the movement. According to various embodiments, when the external storage medium is attached or detached, power supplied to at least one contact (e.g., a power-related contact) placed on the movement may be cut off or delayed to prevent unintended power from being supplied to the external storage medium, thereby preventing a data loss or a fault occurrence in the external storage medium.

The indicator 297 may display a specific state, for example, a booting state, a message state, a charging state, or the like, of the electronic device 201 or one part thereof (e.g., the processor 210). The motor 298 may convert an electric signal into a mechanical vibration, and may generate a vibration or haptic effect. Although not shown, the electronic device 201 may include a processing unit (e.g., a GPU) for supporting a mobile TV. The processing unit for supporting the mobile TV may process media data according to a protocol of, for example, Digital Multimedia Broadcasting (DMB), Digital Video Broadcasting (DVB), MediaFlo®, or the like.

Each of constitutional elements described in the present document may consist of one or more components, and names thereof may vary depending on a type of an electronic device. The electronic device according to various embodiments may include at least one of the constitutional elements described in the present document. Some of the constitutional elements may be omitted, or additional other constitutional elements may be further included. Further, some of the constitutional elements of the electronic device according to various embodiments may be combined and constructed as one entity, so as to equally perform functions of corresponding constitutional elements before combination.

FIG. 3A to FIG. 3H illustrate an electronic device according to an embodiment of the present disclosure. According to various embodiments, an electronic device 300 may include at least one part of constitutional elements of the electronic device 101 of FIG. 1 and the electronic device 201 of FIG. 2.

According to one embodiment, the electronic device 300 may include a housing 3100 for forming all or at least some parts of an exterior of the electronic device 300. According to various embodiments, the housing 3100 may include a non-metal material and/or a metal material. For example, the housing 3100 may be formed of a material such as plastic, metal, carbon fiber, different fiber complexes, ceramic, glass, wood, or of a combination of these materials. Alternatively, the housing 3100 may be integrally formed of one material or a combination of a plurality of materials. Alternatively, the housing 3100 may be partially formed of materials each of which has a different property of matter.

According to one embodiment, the housing 3100 may form a first surface 3100-1, a second surface 3100-2, and a third surface 3100-3. The first surface 3100-1 and second surface 3100-2 of the housing 3100 may face opposite directions. The third surface 3100-3 may surround a space between the first surface 3100-1 and the second surface 3100-2.

According to one exemplary embodiment, the first surface 3100-1 and/or second surface 3100-2 of the housing 3100 may be a flat surface. The third surface 3100-3 of the housing 3100 may include a flat surface or a curved surface.

According to one exemplary embodiment, the housing 3100 may include a first cover 310-1 for forming the first surface 3100-1 and a second cover 310-2 for forming the second surface 3100-2. Further, the housing 3100 may include a bezel 310 for surrounding a space between the first cover 310-1 and the second cover 310-2 and for forming the third surface 3100-3.

According to one embodiment, the electronic device 300 may include a display 311 embedded in a space formed by the first cover 310-1 and second cover 310-2 of the first cover 310-1 of the housing 3100. A screen area of the display 311 may be exposed to the outside through the first cover 310-1. According to various embodiments, the display 311 may further include a touch sensor for a touch input and/or a hovering input. For example, if a finger or a stylus is in contact with the first surface 3100-1, the electronic device 300 may detect the touch input through the display 311. Alternatively, if the finger or the stylus is separated in proximity from the first surface 3100-1, the electronic device 300 may detect the hovering input by using the display 311.

According to one embodiment, the screen area of the display 311 may have a rectangular shape including a first short side 311-1, a second short side 311-2, a first long side 311-3, and a second long side 311-4.

According to one embodiment, the first cover 310-1 may have a rectangular shape including an edge 310-11 adjacent to the first short side 311-1 of the screen area, an edge 310-12 adjacent to the second short side 311-2 of the screen area, an edge 310-13 adjacent to the first long side 311-3 of the screen area, and an edge 310-14 adjacent to the second long side 311-4 of the screen area. Edge 310-13 may connect one end of edge 310-11 and one end of edge 310-12. Edge 310-14 may connect the other end of edge 310-11 and the other end of edge 310-12. A connection portion between edge 310-11 and edge 310-13 may have a curved shape. A connection portion between edge 310-11 and edge 310-14 may have a curved shape. A connection portion between edge 310-12 and edge 310-13 may have a curved shape. Alternatively or additionally, a connection portion between edge 310-12 and edge 310-14 may have a curved shape.

According to one embodiment, when viewed in a direction from the first cover 310-1 to the second cover 310-2, the second cover 310-2 may have a roughly rectangular shape corresponding to the first cover 310-1.

According to various embodiments, the electronic device 300 may include various components disposed between edge 310-11 of the first cover 310-1 and the first short side 311-1 of the screen area. For example, the component may include a receiver 312 for outputting a voice signal received from a peer device as a sound. For example, the component may include at least one sensor 313, 314, or 315. The at least one sensor may include an optical sensor (e.g., an illumination sensor), a proximity sensor, an infrared sensor, an ultrasonic sensor, or the like. For example, the component may include a camera 316 including an image sensor.

According to various embodiments, the electronic device 300 may include various components disposed between edge 310-12 of the first cover 310-1 and the second short side 311-2 of the screen area. For example, the components may be various input keys. The input key may be a press-type button (e.g., a home button) 317. Alternatively, the input key may be touch-type input keys 3181 and 3182.

According to various embodiments, the second cover 310-2 of the electronic device 300 may have a rectangular shape including an edge 310-21 corresponding to edge 310-11 of the first cover 310-1, an edge 310-22 corresponding to edge 310-12 of the first cover 310-1, an edge 310-23 corresponding to edge 310-13 of the first cover 310-1, and an edge 310-24 corresponding to edge 310-14 of the first cover 310-1. Edge 310-23 may connect one end of edge 310-21 and one end of edge 310-22. Edge 310-24 may connect the other end of edge 310-21 and the other end of edge 310-22. A connection portion between edge 310-21 and edge 310-23 may have a curved shape. A connection portion between edge 310-21 and edge 310-24 may have a curved shape. A connection portion between edge 310-22 and edge 310-23 may have a curved shape. Alternatively or additionally, a connection portion between edge 310-22 and edge 310-24 may have a curved shape.

According to various embodiments, the electronic device 300 may include various components (e.g., a camera 3291, a flash 3292) disposed to the second cover 310-2.

According to an embodiment, the first cover 310-1 and/or the second cover 310-2 may be formed of a transparent material (e.g., glass).

According to an embodiment, the bezel 310 may include a first metal frame 31-1 for connecting edge 310-11 of the first cover 310-1 and edge 310-21 of the second cover 310-2. The bezel 310 may include a second metal frame 31-2 for connecting edge 310-12 of the first cover 310-1 and edge 310-22 of the second cover 310-2. The bezel 310 may include a third metal frame 31-3 for connecting edge 310-13 of the first cover 310-1 and edge 310-23 of the second cover 310-2. The bezel 310 may include a fourth metal frame 31-4 for connecting edge 310-14 of the first cover 310-1 and edge 310-24 of the second cover 310-2. The first metal frame 31-1 and the second metal frame 31-2 may be disposed to opposite sides, and the third metal frame 31-3 and the fourth metal frame 31-4 may be disposed to opposite sides. The first metal frame 31-1 may connect one end of the third metal frame 31-3 and one end of the fourth metal frame 31-4. The second metal frame 31-2 may connect the other end of the third metal frame 31-3 and the other end of the fourth metal frame 31-4. A combination of the first metal frame 31-1, the second metal frame 31-2, the third metal frame 31-3, and the fourth metal frame 31-4 may be a roughly rectangular ring shape. The third surface 3100-3 of the housing 3100 formed by the bezel 310 may have a roughly rectangular ring shape.

According to various embodiments, a connection portion between the first metal frame 31-1 and third metal frame 31-3 of the bezel 310 may have a curved shape. A connection portion between the first metal frame 31-1 and fourth metal frame 31-4 of the bezel 310 may have a curved shape. A connection portion between the second metal frame 31-2 and third metal frame 31-3 of the bezel 310 may have a curved shape. Alternatively or additionally, a connection portion between the second metal frame 31-2 and fourth metal frame 31-4 of the bezel 310 may have a curved shape.

According to various embodiments, although not shown, the bezel 310 may include an extension portion (not shown) extended in an inner direction of the housing 3100 from at least one of the first metal frame 31-1, the second metal frame 31-2, the third metal frame 31-3, and the fourth metal frame 31-4. The extension portion may be coupled to a Printed Circuit Board (PCB), a bracket, or the like.

According to various embodiments, at least one of the first metal frame 31-1, second metal frame 31-2, third metal frame 31-3, and fourth metal frame 31-4 of the bezel 310 may include a plurality of metal portions physically separated from one another. According to various embodiments, a non-conductive member may be disposed between the pluralities of metal portions. The non-conductive member may form one part of the third surface 3100-3 of the housing 3100. Alternatively, the non-conductive member may be extended from a non-conductive portion disposed inside the housing 3100.

According to an embodiment, the first metal frame 31-1 of the bezel 310 may include a first metal frame piece 31-1a, a second metal frame piece 31-1b, and a third metal frame piece 31-1c which are physically separated from one another. The second metal frame piece 31-1b may be disposed between the first metal frame piece 31-1a and the third metal frame piece 31-1c.

According to an embodiment, the first metal frame piece 31-1a of the first metal frame 31-1 may be connected to the third metal frame 31-3. The third metal frame piece 31-1c of the first metal frame 31-1 may be connected to the fourth metal frame 31-4. The first metal frame piece 31-1a and the third metal frame 31-3 may be formed of a single metal material. Alternatively, the third metal frame piece 31-1c and the fourth metal frame 31-4 may be formed of a single metal material.

According to an embodiment, the electronic device 300 may include a first non-conductive member 341 disposed between the first metal frame piece 31-1a and the second metal frame 31-1b of the bezel 310. The electronic device 300 may include a second non-conductive member 342 disposed between the second metal frame piece 31-1b and the third metal frame piece 31-1c. The first non-conductive member 341 and the second non-conductive member 342 may be smoothly connected to the first metal frame 31-1, and may form one part of the third surface 3100-3 of the housing 3100. The first non-conductive member 341 and/or the second non-conductive member 342 may be a portion extended from a non-conductive member disposed inside the housing 3100.

According to an embodiment, the electronic device 300 may have a shape which is roughly symmetric at both sides of a center line C1 extending from the first metal frame 31-1 to the second metal frame 31-2. The center line C1 may exist between the first non-conductive member 341 and the second non-conductive member 342, and the first non-conductive member 341 and the second non-conductive member 342 may be disposed at the same distance from the center line C1. Alternatively, the first non-conductive member 341 and the second non-conductive member 342 may be disposed at different distances from the center line C1.

According to one embodiment, a first gap G1 between the first metal frame piece 31-1a and the second metal frame piece 31-1b may be a portion to which the first non-conductive member 341 is filled. A second gap G2 between the second metal frame piece 31-1b and the third metal frame piece 31-1c may be a portion to which the second non-conductive member 342 is filled. A width or distance comprising the first gap G1 and that of the second gap G2 may be identical or different.

According to one embodiment, the second metal frame 31-2 of the bezel 310 may include a fourth metal frame piece 31-2a, a fifth metal frame piece 31-2b, and a sixth metal frame piece 31-2c which are physically separated from one another. The fifth metal frame piece 31-2b may be disposed between the fourth metal frame piece 31-2a and the sixth metal frame piece 31-2c.

According to one embodiment, the fourth metal frame piece 31-2a of the second metal frame 31-2 may be connected to the third metal frame 31-3. The sixth metal frame piece 31-2c of the second metal frame 31-2 may be connected to the fourth metal frame 31-4. The fourth metal frame piece 31-2a and the third metal frame 31-3 may be formed of a single metal material. Alternatively, the sixth metal frame piece 31-2c and the fourth metal frame 31-4 may be formed of a single metal material.

According to an embodiment, the electronic device 300 may include a third non-conductive member 343 disposed between the fourth metal frame piece 31-2a and fifth metal frame piece 31-2b of the bezel 310. The electronic device 300 may include a fourth non-conductive member 344 disposed between the fifth metal frame piece 31-2b and the sixth metal frame piece 31-2c. The third non-conductive member 343 and the fourth non-conductive member 344 may be smoothly connected to the second metal frame 31-2, and may form one part of the third surface 3100-3 of the housing 3100. The third non-conductive member 343 and/or the fourth non-conductive member 344 may be a portion extended from a non-conductive member disposed inside the housing 3100.

According to one embodiment, the center line C1 may exist between the third non-conductive member 343 and the fourth non-conductive member 344, and the third non-conductive member 343 and the fourth non-conductive member 344 may be disposed at the same distance from the center line C1. Alternatively, the third non-conductive member 343 and the fourth non-conductive member 344 may be disposed at different distances from the center line C1.

According to an embodiment, a third gap G3 between the fourth metal frame piece 31-2a and the fifth metal frame piece 31-2b may be a portion to which the third non-conductive member 343 is filled. A fourth gap G4 between the fifth metal frame piece 31-2b and the sixth metal frame piece 31-2c may be a portion to which the fourth non-conductive member 344 is filled. A width or distance comprising the third gap G3 and that of the fourth gap G4 may be identical or different.

According to one embodiment, the first non-conductive member 341 and the third non-conductive member 343 may be disposed at the same distance from the center line C1. Alternatively, the first non-conductive member 341 and the third non-conductive member 343 may be disposed at different distances from the center line C1.

According to an embodiment, the second non-conductive member 342 and the fourth non-conductive member 344 may be disposed at the same distance from the center line C1. Alternatively, the second non-conductive member 342 and the fourth non-conductive member 344 may be disposed at different distances from the center line C1.

According to an embodiment, the bezel 310 may be used as at least one part of a wireless communication unit. The bezel 310 may be used as at least one part of the wireless communication unit of the electronic device 300 capable of transmitting/receiving a radio signal through electrical coupling between the first metal frame 31-1, the second metal frame 31-2, the third metal frame 31-3, and the fourth metal frame 31-4. For example, at least one part of the bezel 310 may play a role of an antenna radiator by setting to a "first state" of being electrically connected to a communication circuit (not shown) of the electronic device 300. Alternatively, the at least one part of the bezel 310 may play a role of an antenna ground by setting to a "second state" of being electrically connected to a ground member (not shown) (e.g., a ground of a PCB) of the electronic device 300. Alternatively, the at least one part of the bezel 310 may be set to a "third state" which is a floating state.

According to various embodiments, at least one portion of the second metal frame piece 31-1b of the first metal frame 31-1 may be set to at least one of the "first state" and the "second state", or may be set to the "third state". At least one portion of the fifth metal frame piece 31-2b of the second metal frame 31-2 may be set to at least one of the "first state" and the "second state", or may be set to the "third state". At least one portion of a metal frame including the first metal frame piece 31-1a of the first metal frame 31-1, the fourth metal frame piece 31-2a of the second metal frame 31-2, and the third metal frame 31-1, may be set to at least one of the "first state" and the "second state", or may be set to the "third state". Alternatively, at least one portion of a metal frame including the third metal frame piece 31-1c of the first metal frame 31-1, the sixth metal frame piece 31-2c of the second metal frame 31-2, and the fourth metal frame 31-4, may be set to at least one of the "first state" and the "second state", or may be set to the "third state".

According to one embodiment, the electronic device 300 may include a communication circuit (not shown) and a control circuit (e.g., a processor). The communication circuit may be included in a wireless communication unit which uses at least one part of the bezel 310 of the electronic device 300. The communication circuit may convert a radio signal received from the outside through at least one part of the bezel 310 into a baseband signal, and may deliver the baseband signal to the communication circuit. The control circuit may deliver the baseband signal to the communication circuit, and the communication circuit may convert the baseband signal into a radio signal and may transmit the radio signal to the air through the at least one part of the bezel 310.

According to one embodiment, the communication circuit may support various types of communication using at least one part of the bezel 310. For example, the communication circuit may support cellular communication and near-distance communication (e.g., WiFi, Bluetooth®, NFC, GNSS, or the like). Alternatively, the communication circuit may also support magnetic signal transmission/reception (e.g., Magnetic Secure Transmission (MST) for electronic payment).

The communication circuit may include all RF components between the bezel 310 and the control circuit. For example, the communication circuit may include a Radio Frequency Integrated Circuit (RFIC) and a Front End Module (FEM). The RFIC (e.g., the RF transceiver) may receive a radio frequency from a base station, and may modulate a received high frequency band into a low frequency band (i.e., a baseband) that can be processed in the control circuit. For example, the RFIC may modulate the low frequency processed in the module into a high frequency for transmission of the base station. For example, the FEM may be a transmitting/receiving device capable of controlling a radio-wave signal. For example, the FEM may connect the bezel 310 and the RFIC, and may separate transmission/reception signals. For example, the FEM may play a role of filtering and amplifying, and may include a reception FEM having a filter to perform filtering on a reception signal and a transmission FEM having a Power Amplifier Module (PAM) to amplify a transmission signal.

The communication circuit may use at least one part of the bezel 310 to support at least one communication scheme among Single Input Multiple Output (SIMO), Multiple Input Single Output (MISO), diversity, and Multiple Input Multiple Output (MIMO).

Figure 3A:
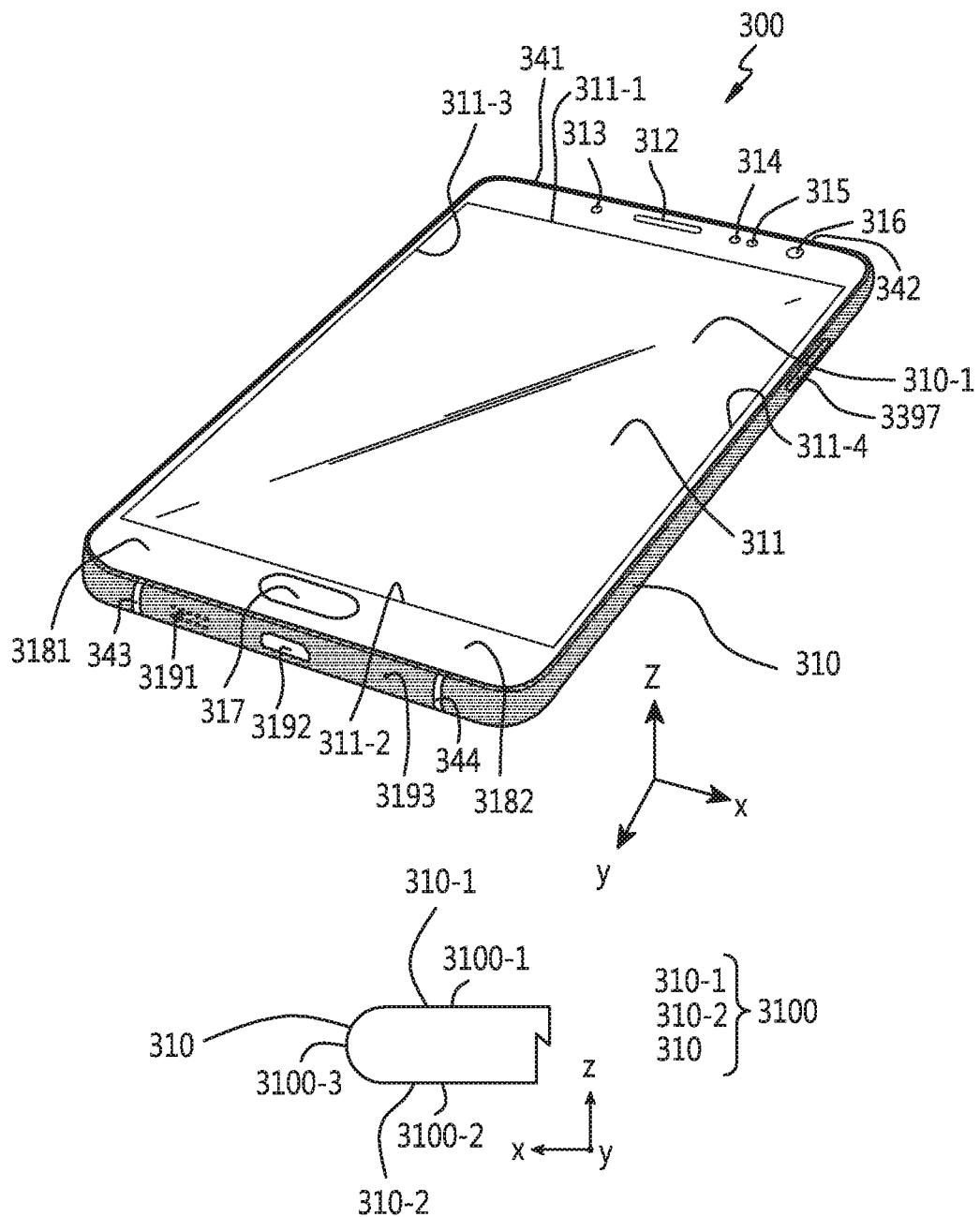
FIG. 3A to FIG. 3H illustrate an electronic device according to an embodiment of the present disclosure.
Figure 3B:
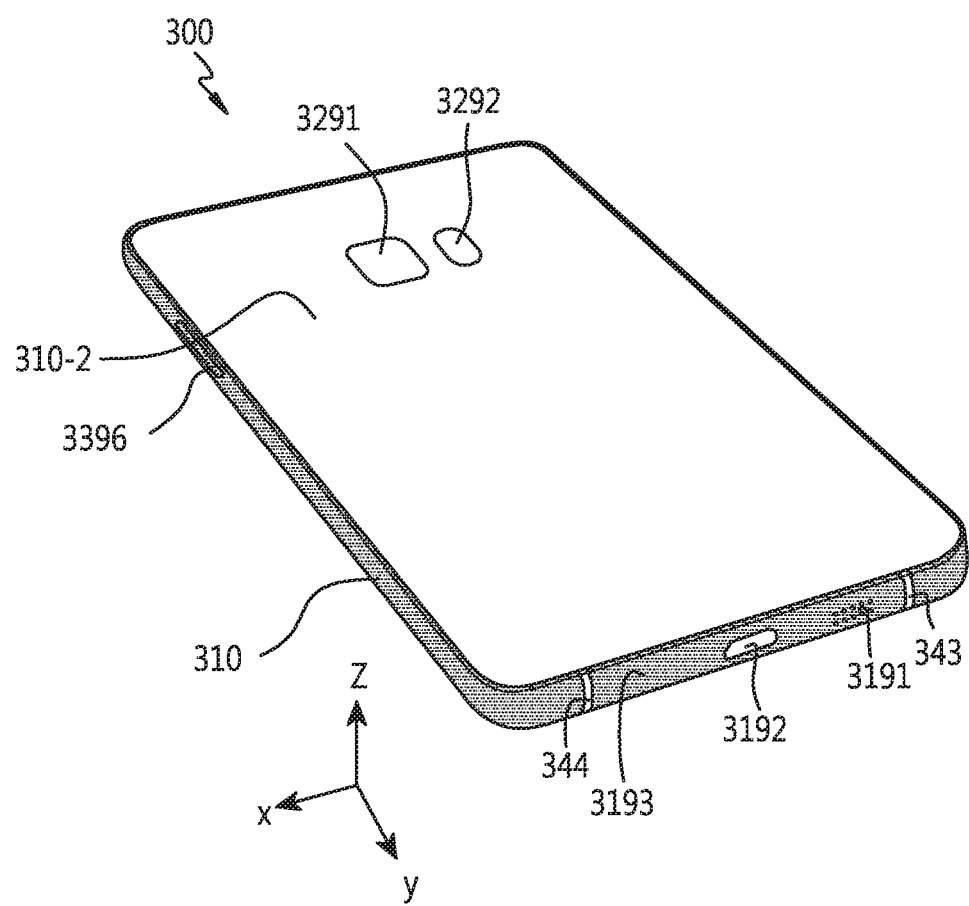
Figure 3C:
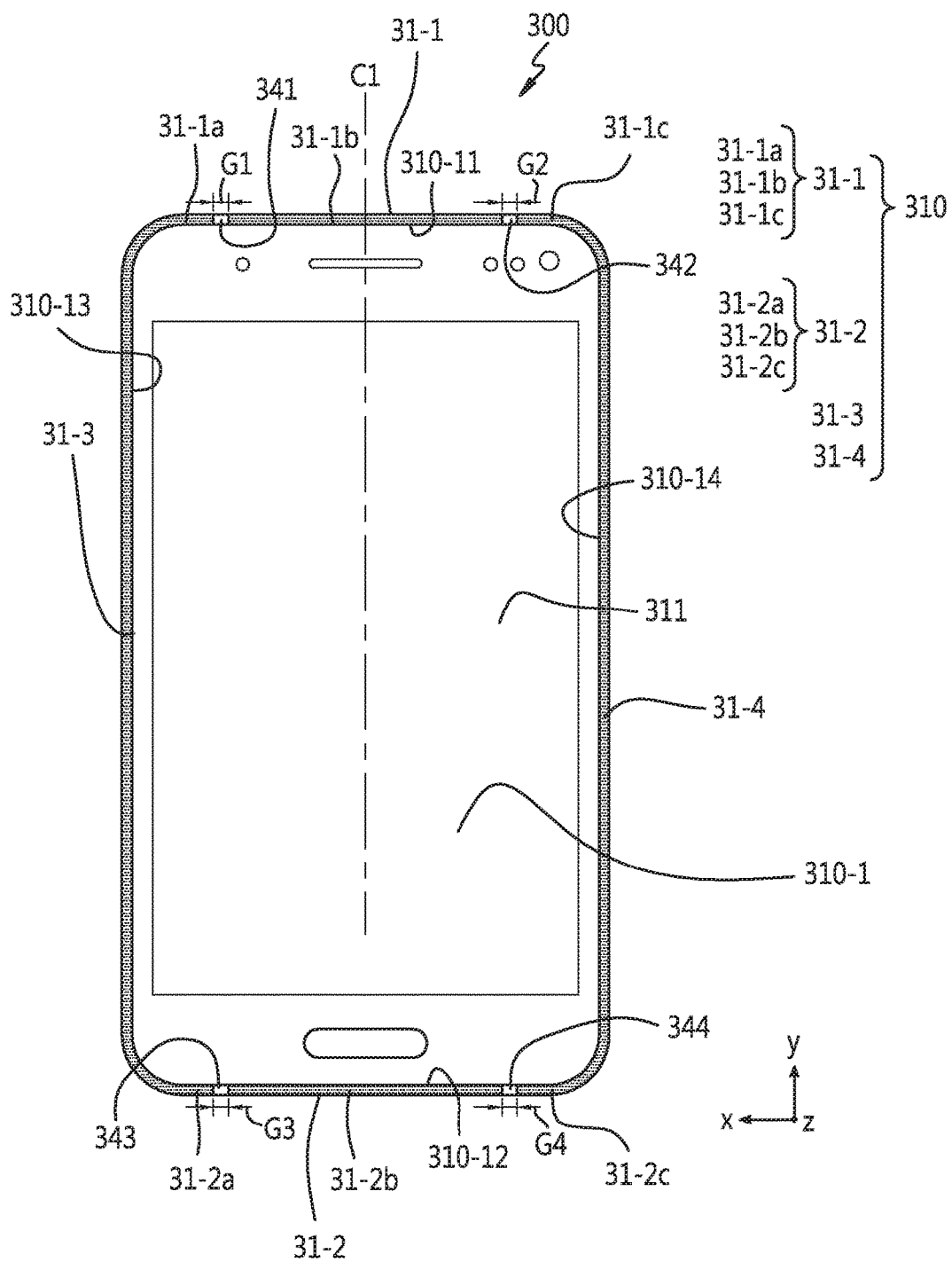
Figure 3D:
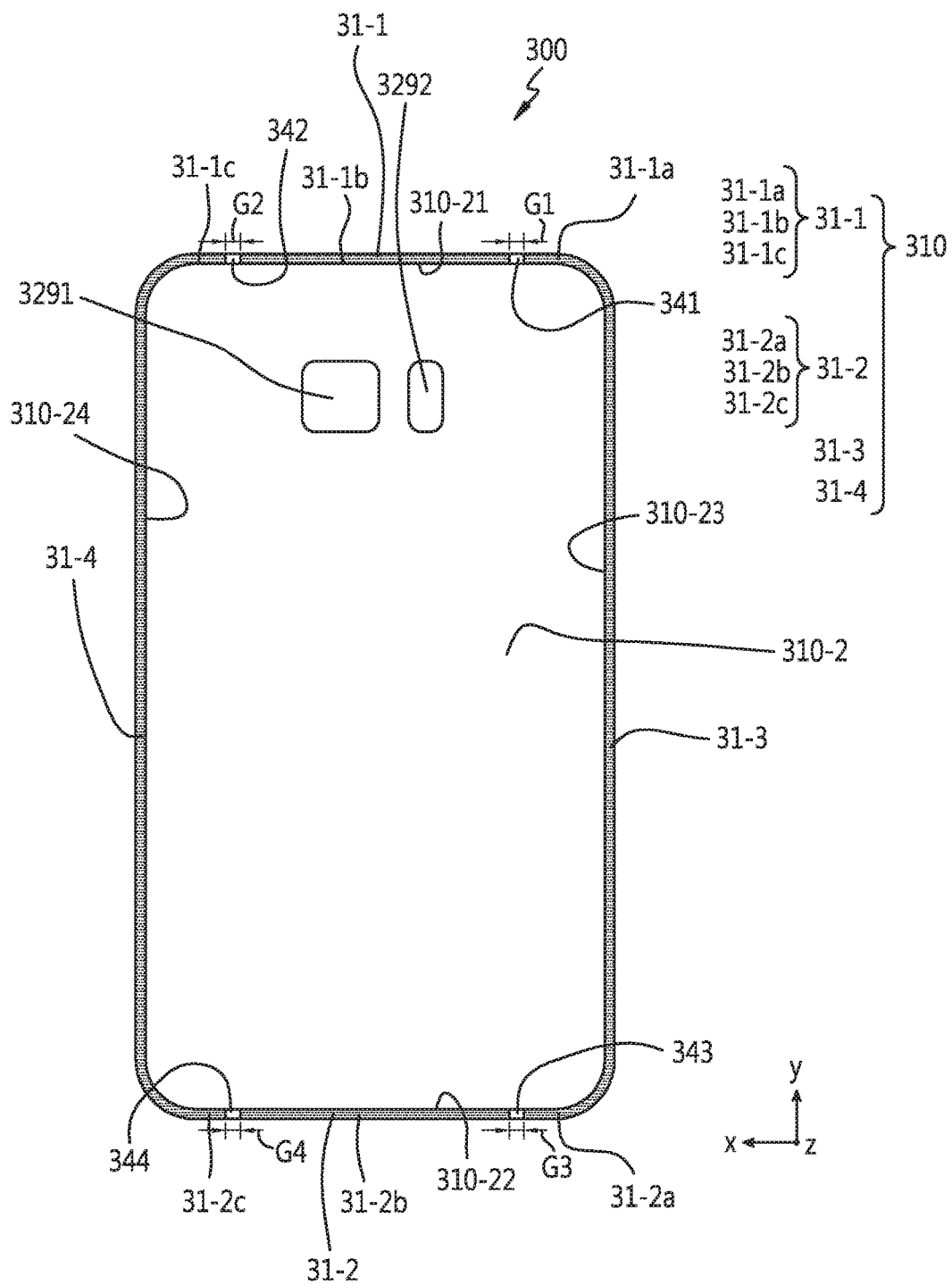
Figure 3E:
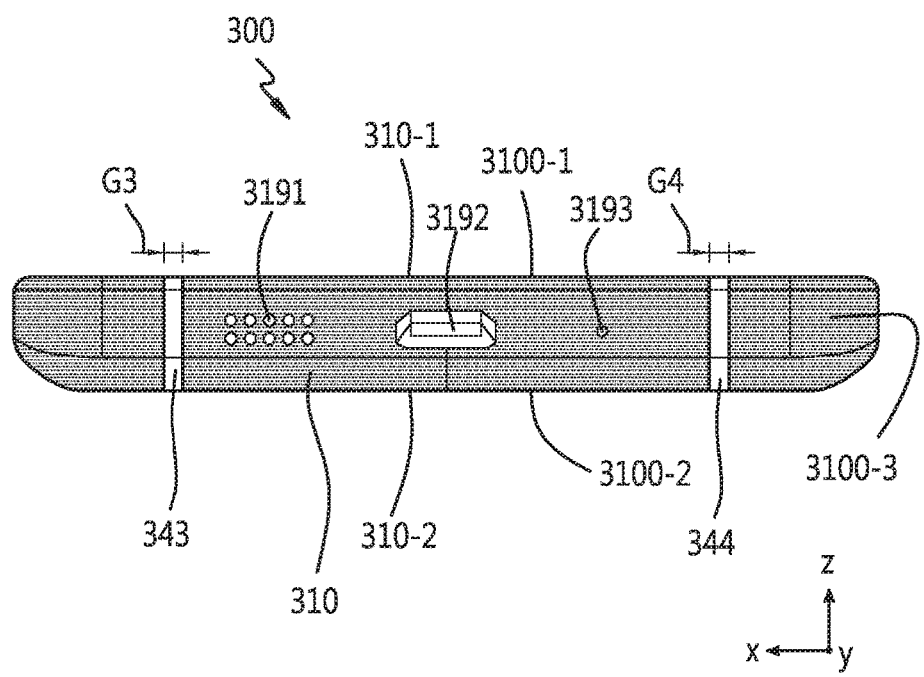

Referring to FIG. 3E, according to various embodiments, the bezel 310 may include a through-hole for supporting various components of the electronic device 300. For example, the fifth metal frame piece 31-2b of the bezel 310 may include a through-hole 3191 used to output a sound generated from a speaker (not shown) of the electronic device 300 to the outside. Alternatively, the fifth metal frame piece 31-2b of the bezel 310 may include a through-hole 3192 used to connect an external connecter to a connector (not shown) of the electronic device 300. Alternatively, the fifth metal frame piece 31-2b of the bezel 310 may include a through-hole 3193 used to introduce an external sound to a microphone (not shown) of the electronic device 300.

Figure 3F:
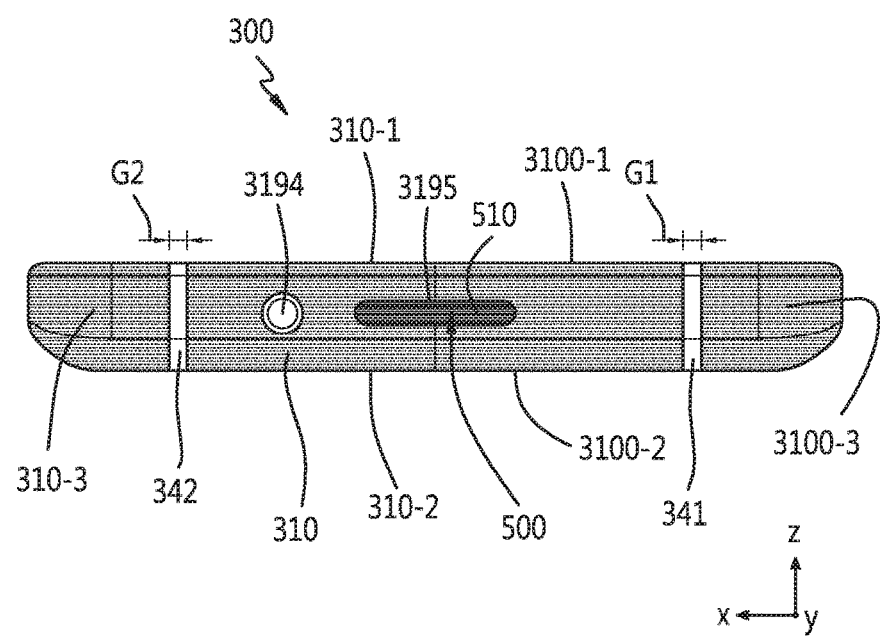
Figure 3G:
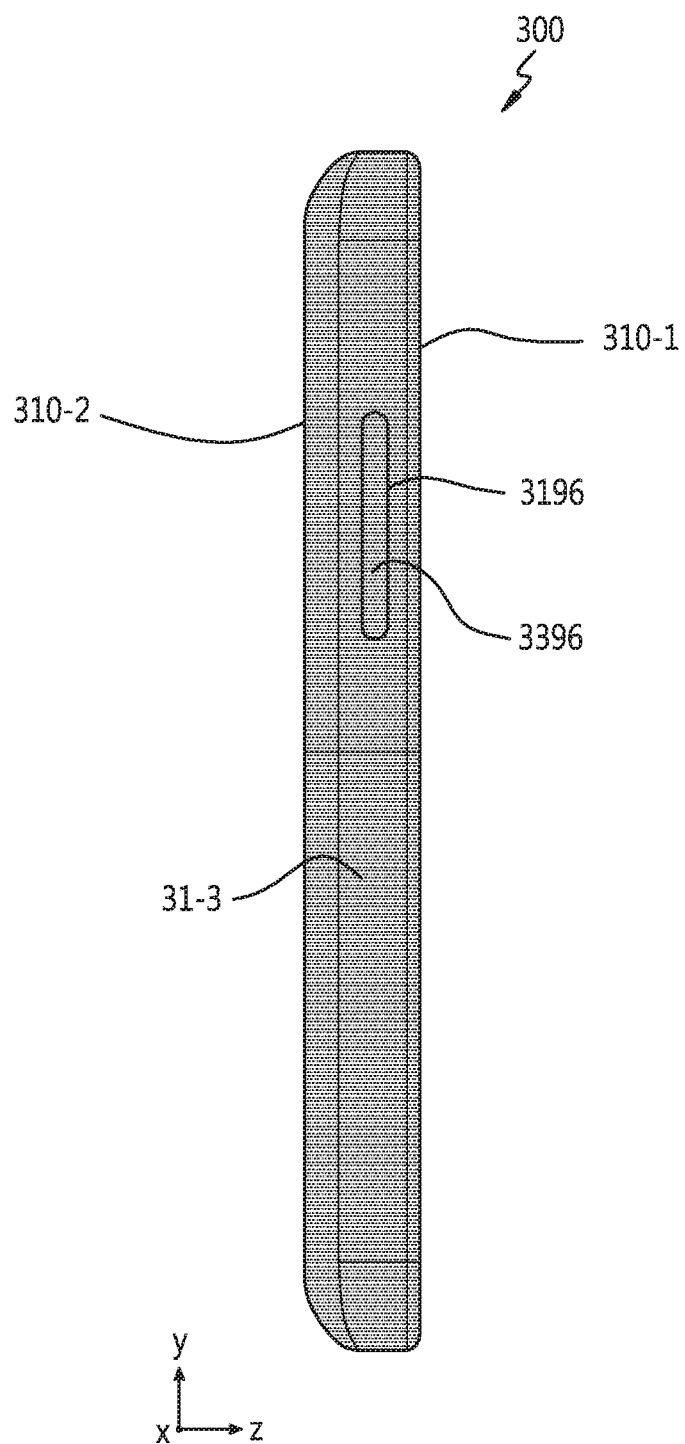

Referring to FIG. 3G, according to various embodiments of the present disclosure, the third metal frame 31-3 of the bezel 310 may include a through-hole 3196 for supporting a button (e.g., a volume control button) 3396 of the electronic device 300.

Figure 3H:
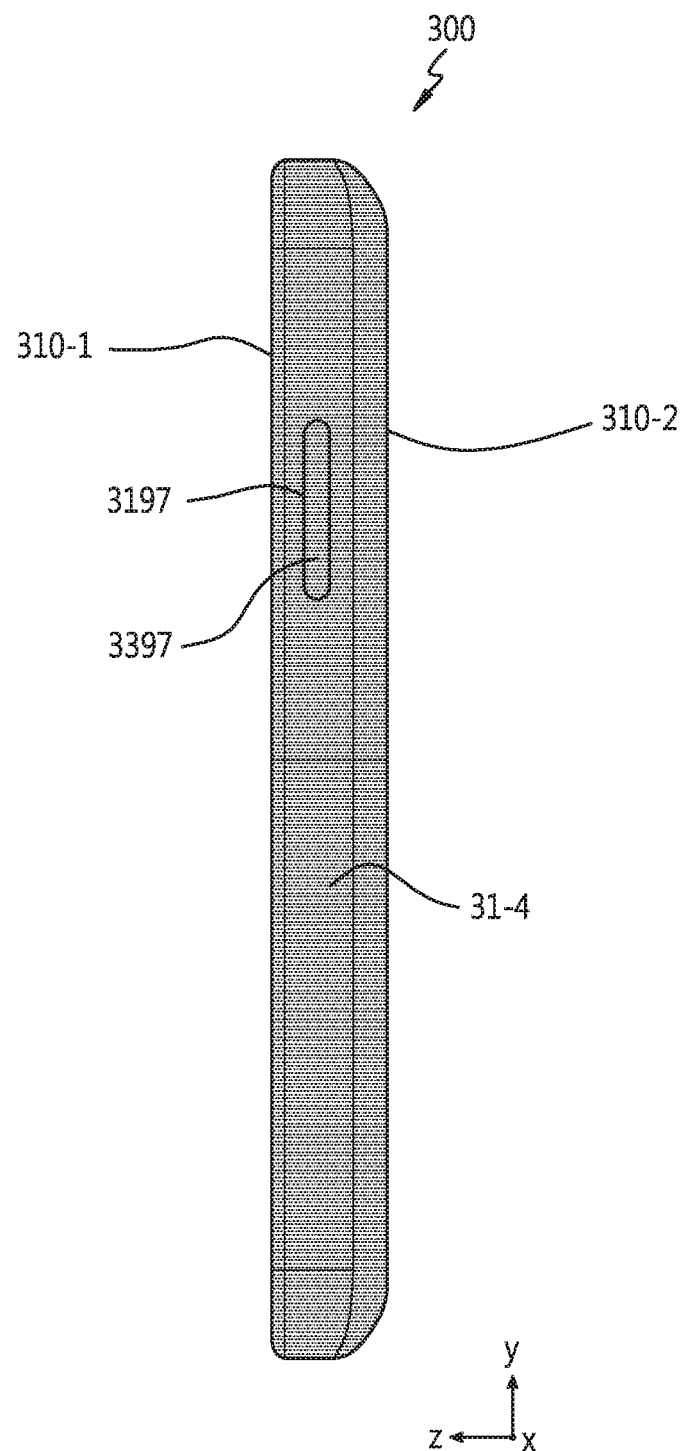

Referring to FIG. 3H, according to various embodiments of the present disclosure, the fourth metal frame 31-4 of the bezel 310 may include a through-hole 3197 for supporting a button (e.g., a power button) 3397 of the electronic device 300.

Referring to FIG. 3F, according to various embodiments of the present disclosure, the second metal frame piece 31-1*b* of the first metal frame 31-1 of the bezel 310 may include a through-hole 3194 configured to receive an ear plug (not shown) inserted therein, which is connects to an ear jack (not shown) of the electronic device 300. Additionally or alternatively, according to various embodiments, the second metal frame piece 31-1*b* of the first metal frame 31-1 of the bezel 310 may include a through-hole 3195 configured to receive at least one external storage medium (not shown) inserted therein, which may also be inserted into a socket (not shown) of the electronic device 300. According to one embodiment, a plurality of external storage media (not shown) may be attached at once to the socket (not shown) of the electronic device 300.

According to one embodiment, the plurality of external storage media may be attached to a tray (or an adapter) 500. The tray 500 to which the plurality of external storage media are attached may be attached (or inserted) to the socket of the electronic device 300 through the through-hole 3195. If the tray 500 to which the plurality of external storage media are attached is attached to the socket of the electronic device 300, the plurality of external storage media may be electrically connected to a plurality of contacts.

According to one embodiment, if the tray 500 is attached to the socket of the electronic device 300 through the through-hole 3195, one portion 510 of the tray 500 may be engaged into the through-hole 3195, and may form one portion of the third surface 3100-3 of the electronic device 300.

Figure 4A:
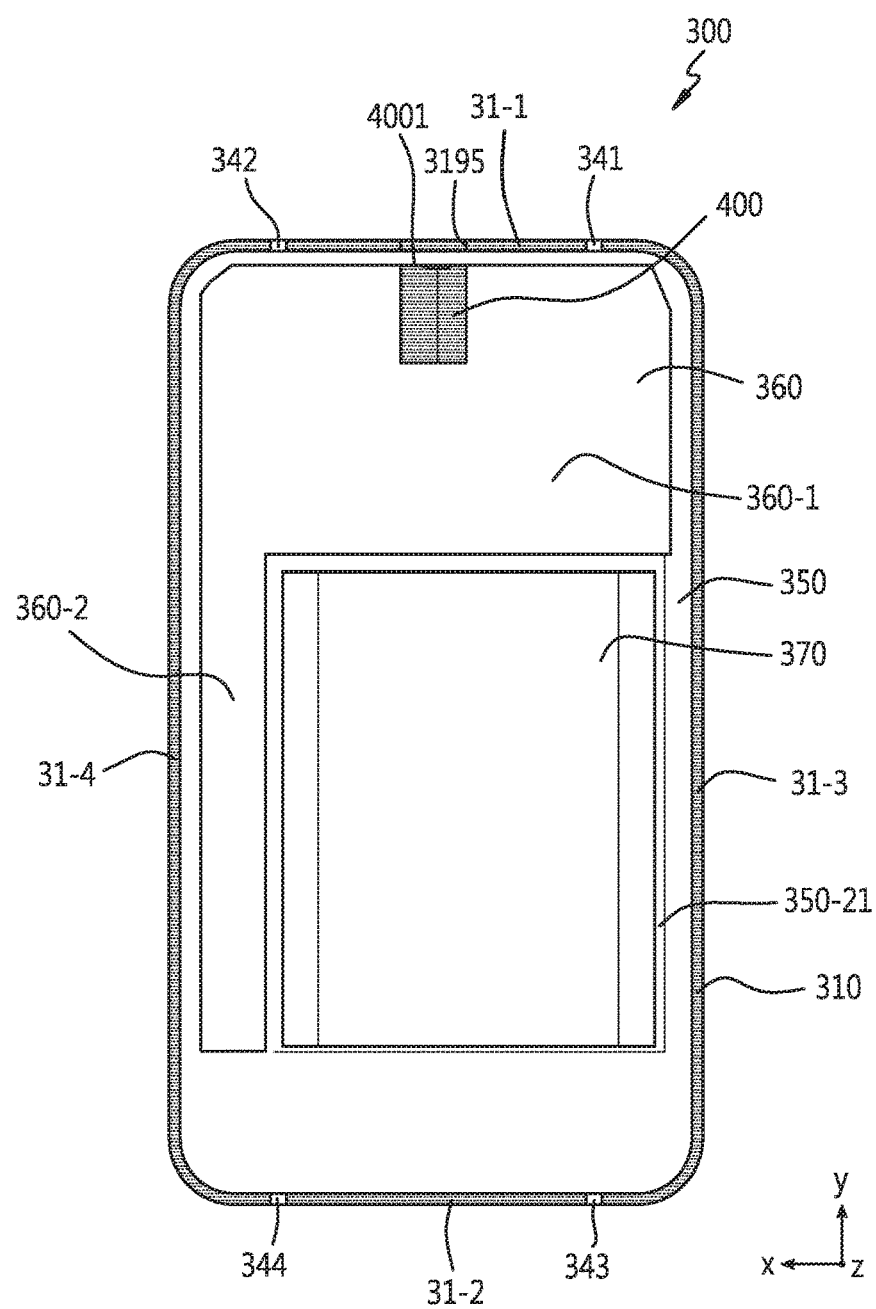
FIG. 4A briefly illustrates a state in which a second cover is detached from an electronic device according to an embodiment of the present disclosure.
Figure 4A:
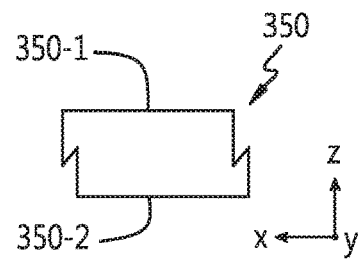
Figure 4B:
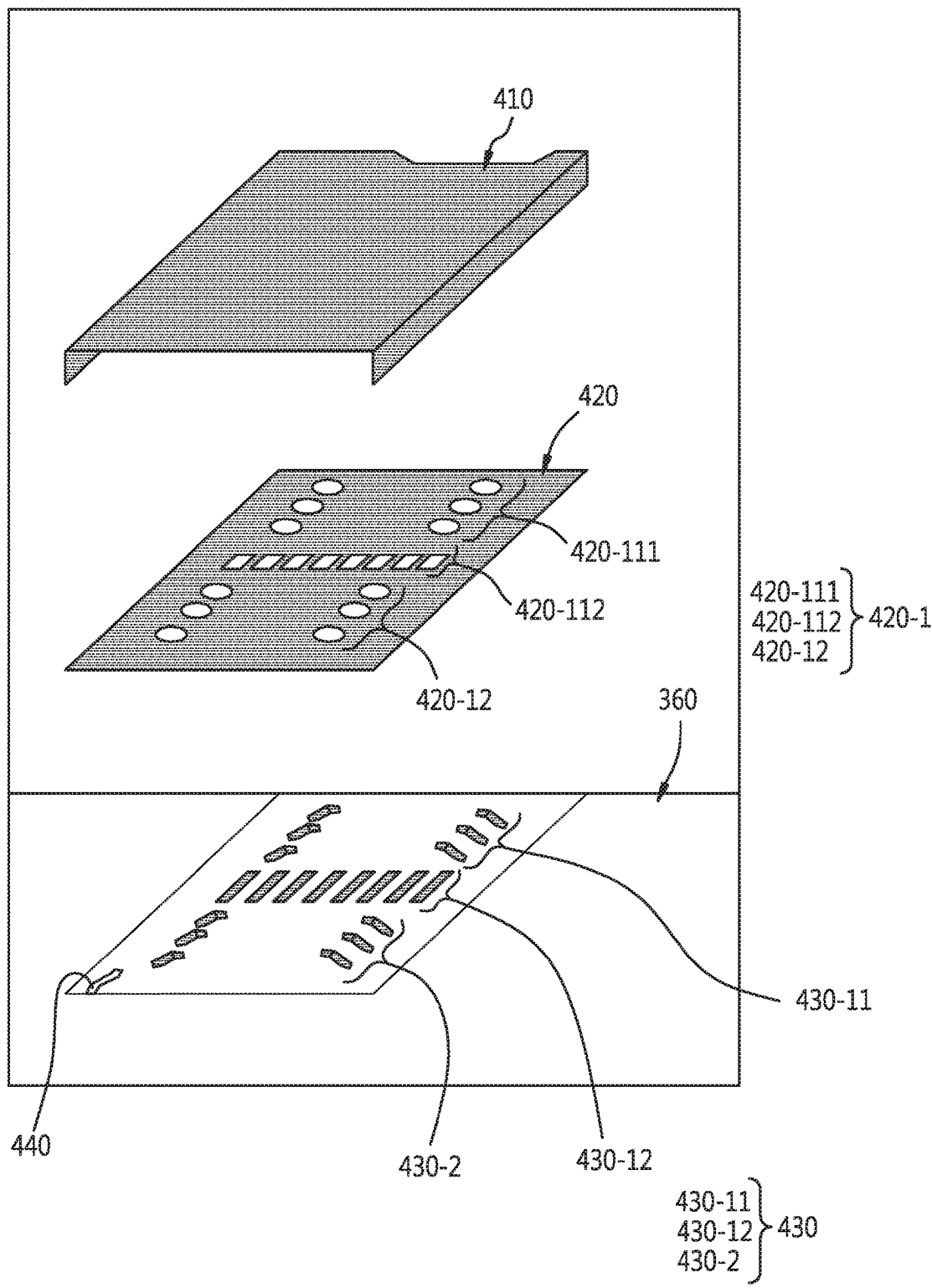
FIGS. 4B and 4C illustrate a socket and a Printed Circuit Board (PCB) according to an embodiment of the present disclosure.
Figure 4C:
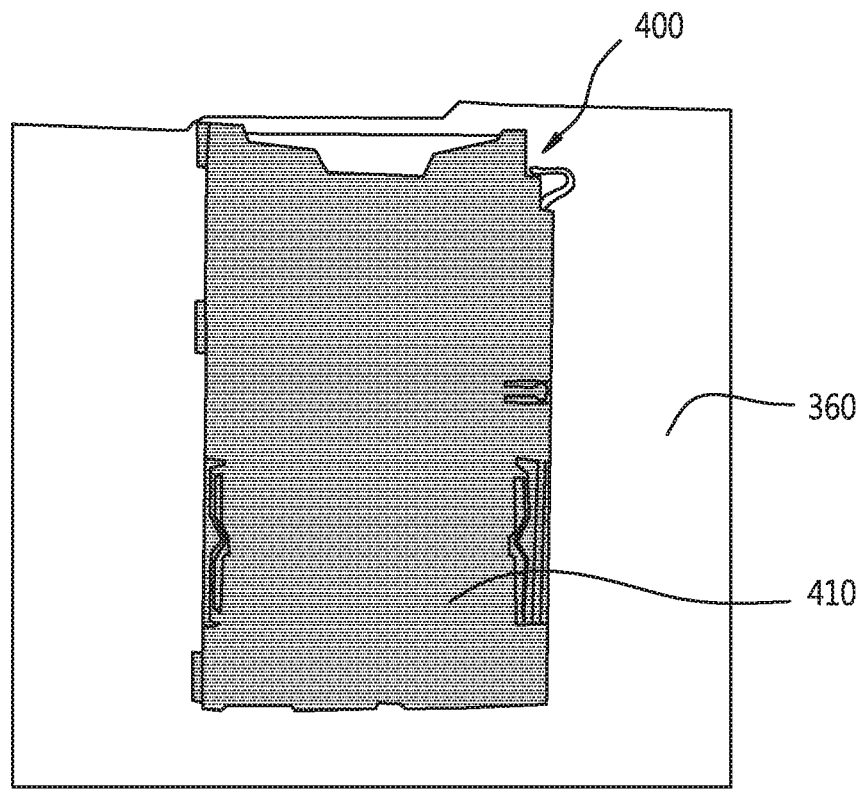
Figure 4D:
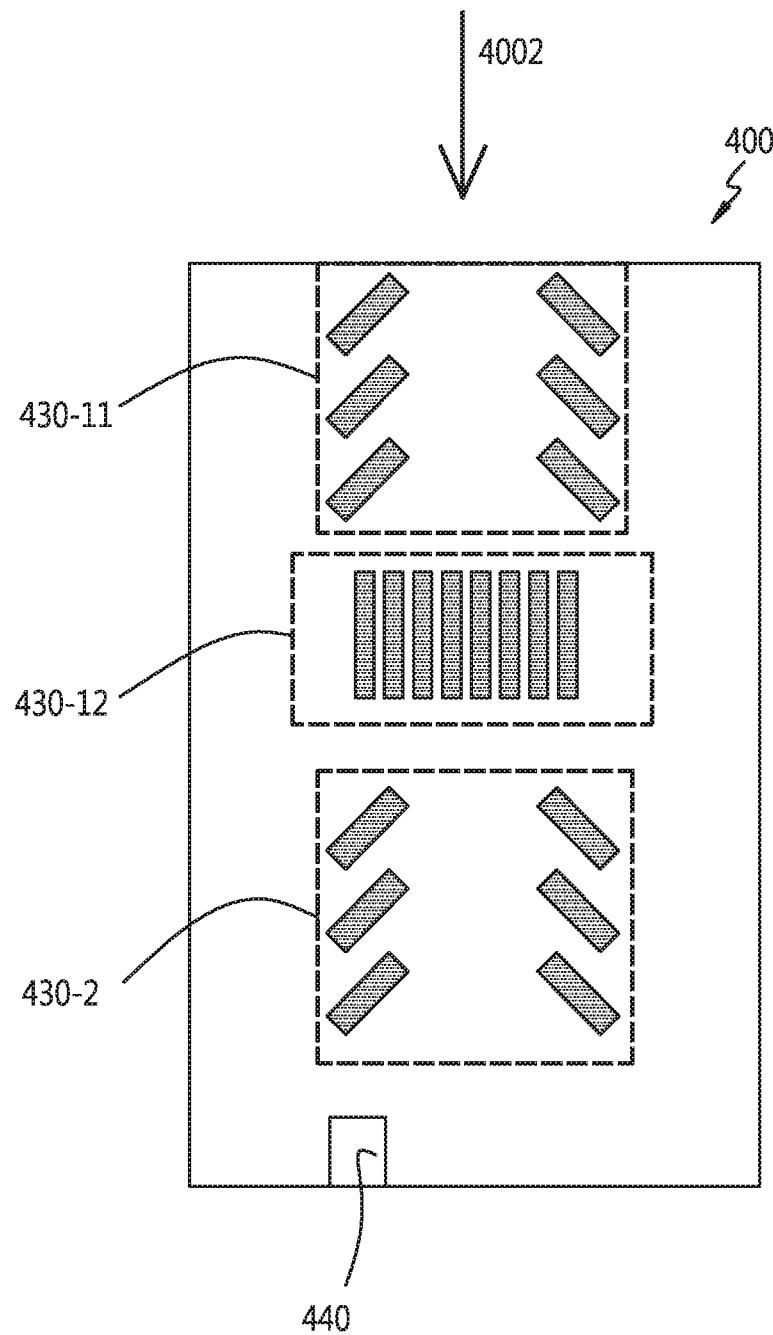
FIG. 4D illustrates contacts of a socket according to an embodiment of the present disclosure.
Figure 4E:
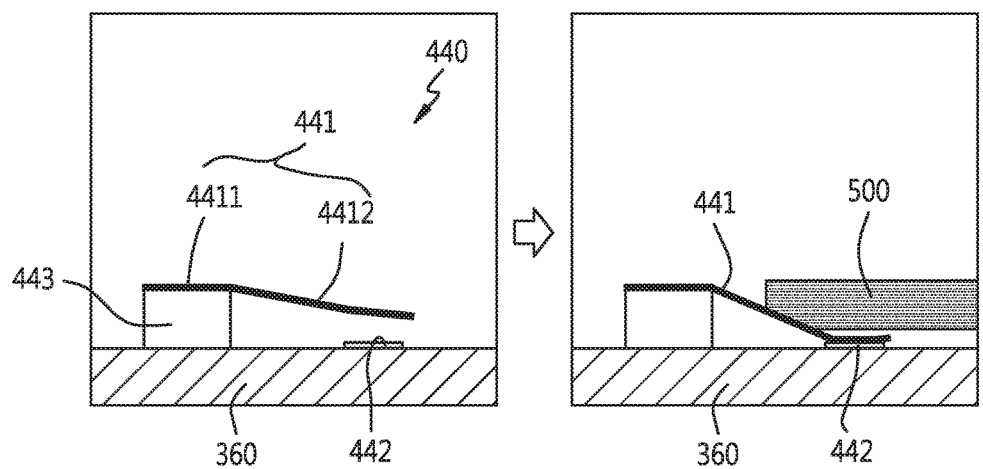
FIG. 4E illustrates a contact for recognizing a tray to which an external storage medium is attached in a socket according to an embodiment of the present disclosure.

FIG. 4A briefly illustrates a state in which the second cover 310-2 is detached from the electronic device 300 according to an embodiment of the present disclosure. FIGS. 4B and 4C illustrate a socket and a PCB according to an embodiment of the present disclosure. FIG. 4D illustrates contacts of a socket according to an embodiment of the present disclosure. FIG. 4E illustrates a contact for recognizing a tray to which an external storage medium is attached in a socket according to an embodiment of the present disclosure.

Referring to FIG. 4A, the electronic device 300 may include a bracket 350, a PCB 360, and a battery pack 370 which are placed therein.

The bracket 350 may be surrounded by the bezel 310, and may have a roughly plate shape. The bracket 350 may be disposed between a first cover (e.g., the first cover 310-1 of FIG. 3A) and a second cover (e.g., the second cover 310-2 of FIG. 3A). The bracket 350 may include a first surface 350-1 and a second surface 350-2 facing an opposite direction of the first surface 350-1. The first surface 350-1 may face the first cover (e.g., the first cover 310-1 of FIG. 3A), and the second surface 350-2 may face the second cover (e.g., the second cover 310-2 of FIG. 3A). Various components of the electronic device 300 may be attached to the bracket 350, and may be disposed unwaveringly in a reliable state.

According to one embodiment, a display (e.g., the display 311 of FIG. 3A) may be attached to the first surface 350-1 of the bracket 350, and may be disposed between the first cover 310-1 and the bracket 350.

According to one embodiment, the PCB 360 may be attached to the second surface 350-2 of the bracket 350, and may be disposed between the bracket 350 and the second cover 310-2. For example, the PCB 360 may be attached to the bracket 350 by using bolt fastening.

According to one embodiment, the battery pack 370 may be disposed to the second surface 350-2 of the bracket 350, and may be disposed between the bracket 350 and the second cover 310-2. For example, the second surface 350-2 of the bracket 350 may include a groove 350-21 in which at least one part of the battery pack 370 is engaged in a direction from the second cover 310-2 to the first cover 310-1.

According to various embodiments, the battery pack 370 may be attached to the electronic device 300 by using bolt fastening, an adhesive substance, or the like. Alternatively, although not shown, the electronic device 300 may include a metal or non-metal covering plate which covers the battery pack 370. The covering plate may be attached to the bracket 350 by using bolt fastening or the like, and the battery pack 370 may be disposed between the covering plate and the bracket 350.

According to one embodiment, at least one of the first non-conductive member 341, the second non-conductive member 342, the third non-conductive member 343, and the fourth non-conductive member 344 may be one part of the bracket 350.

According to one embodiment, the PCB 360 may have a roughly 'L' shape including a first portion 360-1 and a second portion 360-2. The first portion 360-1 may have a plate shape extended in a direction from the fourth metal frame 31-4 to the third metal frame 31-3. The second portion 360-2 may have a plate shape extended in a direction from the first metal frame 31-1 to the second metal frame 31-2. The first portion 360-1 may be disposed between the battery pack 370 and the first metal frame 31-1. The second portion 360-2 may be disposed between the battery pack 370 and the fourth metal frame 31-4.

According to one embodiment, a socket 400 may be disposed to the first portion 360-1 of the PCB 360. The socket 400 may be disposed to be adjacent to the first metal frame 31-1. The socket 400 may include an opening 4001 for inserting a tray (e.g., the tray 500 of FIG. 3F), and the opening 4001 may be aligned with the through-hole 3195 of the first metal frame 31-1.

Referring to FIG. 4A to FIG. 4D, the socket 400 may be mounted on the PCB 360. According to one embodiment, the socket 400 may include a first housing 410 and a second housing 420. If the first housing 410 and the second housing 420 are attached, a space capable of inserting the tray (e.g., the tray 500 of FIG. 3F) may be formed.

According to one embodiment, the socket 400 may include a plurality of contacts 430 mounted on the PCB 360. If the tray (e.g., the tray 500 of FIG. 3F) to which a plurality of external storage media are attached is attached to the socket 400, the plurality of contacts 430 may be electrically connected to contacts (not shown) of the plurality of external storage media.

According to one embodiment, the second housing 420 of the socket 400 may include a plurality of through-holes 420-1. The second housing 420 may be disposed between the first housing 410 and the PCB 360, and may be attached to the PCB 360. The plurality of contacts 430 may protrude to a space of the socket 400 respectively through the plurality of through-holes 420-1 of the second housing 420. For example, the plurality of contacts 430 may include one end (not shown) attached to the PCB 360 and a free end (not shown) extended from the one end. The free end of the plurality of contacts 430 may be introduced to the space of the socket 400 through the through-holes 420-1 of the second housing 420. If the tray (e.g., the tray 500 of FIG. 3F) to which the plurality of external storage media are attached is inserted to the socket 400, the free end of the plurality of contacts 430 may elastically press the contacts (not shown) of the plurality of external storage media.

According to one embodiment, the plurality of contacts 430 of the socket 400 may include a plurality of first contacts 430-11, a plurality of third contacts 430-12, and a plurality of second contacts 430-2. For example, the plurality of first contacts 430-11, the plurality of third contacts 430-12, and the plurality of second contacts 430-2 may be disposed in an orderly manner in a direction 4002 (as shown in FIG. 4D) in which the tray 500 is inserted to the socket 400. For example, the plurality of first contacts 430-11 may be adjacent to the through-hole 3195 of the first metal frame 31-1. The plurality of third contacts 430-12 may be disposed between the plurality of first contacts 430-11 and the plurality of second contacts 430-2.

According to one embodiment, when viewed in the direction 4002 in which the tray 500 is inserted to the socket 400, at least one of the plurality of first contacts 430-11 may be aligned on a virtual straight line with at least one of the plurality of third contacts 430-12. For example, when viewed in the direction 4002 in which the tray 500 is inserted to the socket 400, a contact area of at least one contact of the plurality of first contacts 430-11 may be at least partially aligned on a virtual straight line with a contact area of at least one contact of the plurality of third contacts 430-12.

According to one embodiment, when viewed in the direction 4002 in which the tray 500 is inserted to the socket 400, at least one of the plurality of first contacts 430-11 may be aligned on a virtual straight line with at least one of the plurality of second contacts 430-2. For example, when viewed in the direction 4002 in which the tray 500 is inserted to the socket 400, a contact area of at least one contact of the plurality of first contacts 430-11 may be at least partially aligned on a virtual straight line with a contact area of at least one contact of the plurality of second contacts 430-2.

According to one embodiment, when viewed in the direction 4002 in which the tray 500 is inserted to the socket 400, at least one of the plurality of third contacts 430-12 may be aligned on a virtual straight line with at least one of the plurality of second contacts 430-2. For example, when viewed in the direction 4002 in which the tray 500 is inserted to the socket 400, a contact area of at least one contact of the plurality of third contacts 430-12 may be at least partially aligned on the virtual straight line with the contact area of at least one contact of the plurality of second contacts 430-2.

According to an embodiment, an arrangement relation of the plurality of first contacts 430-11 may be similar to or the same as an arrangement relation of the plurality of second contacts 430-2. For example, the plurality of first contacts 430-11 and the plurality of second contacts 430-2 may be configured for similar or identical external storage media.

According to one embodiment, an arrangement relation of the plurality of third contacts 430-12 may be different from an arrangement relation of the plurality of first contacts 430-11 and/or the plurality of second contacts 430-2. For example, the plurality of third contacts 430-12 may be for external storage media different from those of the plurality of first contacts 430-11 and/or the plurality of second contacts 430-2.

The plurality of first contacts 430-11, the plurality of third contacts 430-12, or the plurality of second contacts 430-2 may be for various types of external storage media. According to one embodiment, the plurality of first contacts 430-11 and/or the plurality of second contacts 430-2 may be for a Subscriber Identification Module (SIM) card or a Universal Subscriber Identification Module (USIM) card. Alternatively, the plurality of third contacts 430-12 may be for a memory card (e.g., a Compact Flash (CF), a Multi Media Card (MMC), a Smart Media Card (SMC), a Secure Disk (SD), a Memory Stick (MS), etc.).

Referring to FIGS. 4B, 4D, and 4E, according to one embodiment, the socket 400 may include a contact 440 used to determine whether the tray 500 is inserted.

According to one embodiment, the contact 440 may include a first contact 441 and a second contact 442. In the contact 440, the first contact 441 and second contact 442 of the contact 440 may be electrified if the tray 500 is completely inserted to the socket 400. For example, the first contact 441 may include one end 4411 attached to one portion 443 of the socket 400 and an extension portion 4412 extended from the one end 4411 in a direction of an opening (e.g., the opening 4001 of FIG. 4A) of the socket 400. The second contact 442 may be disposed to the PCB 360. If the tray 500 is completely inserted to the socket 400, the tray 500 may press the extension portion 4412 of the first contact 441, and the extension portion 4412 may be electrically connected to the second contact 442 in a sagging manner in a direction of the second contact 442 similarly to a cantilever. Alternatively, when the tray 500 is detached from the socket 400, the first contact 441 may be restored to an original shape, and the electrification between the first contact 441 and the second contact 442 may be removed.

According to various embodiments, the plurality of contacts 440 may be installed at various locations. For example, if all contacts of the plurality of contacts are electrified, the electronic device (e.g., the electronic device 101 of FIG. 1) may recognize that the tray 500 is completely attached to the socket 400. Alternatively, if at least one of the plurality contacts is electrified and the remaining contacts are not electrified, the electronic device 101 may recognize that the tray 500 is incompletely attached to the socket 400. Alternatively, if all contacts of the plurality of contacts are not electrified, the electronic device 101 may recognize that the tray 500 does not exist.

According to various embodiments, the electronic device (e.g., the electronic device 101 of FIG. 1) may include various types of detectors, switches, and/or sensors (e.g., a proximity sensor, a pressure sensor, a hall sensor, etc.) used to determine whether the tray 500 is attached to the socket 400 or an attachment level (e.g., complete attachment or incomplete attachment) by which the tray 500 is attached to the socket 400.

According to various embodiments, the socket 400 may include a hall sensor, and the tray 500 may include a magnet. When the tray 500 is attached to the socket 400, the hall sensor may output a signal related thereto.

According to various embodiments, the tray 500 may include an element (e.g., a magnet, a coil, an electromagnetic induction resonant circuit, etc.) which may cause a change in an electromagnetic field. The electronic device (e.g., the electronic device 101 of FIG. 1) generates the electromagnetic field, and may determine whether or not the tray is inserted into the socket 400 or may determine an inserting level by which the tray is inserted to the socket 400 on the basis of the change of the electromagnetic field.

Figure 5A:
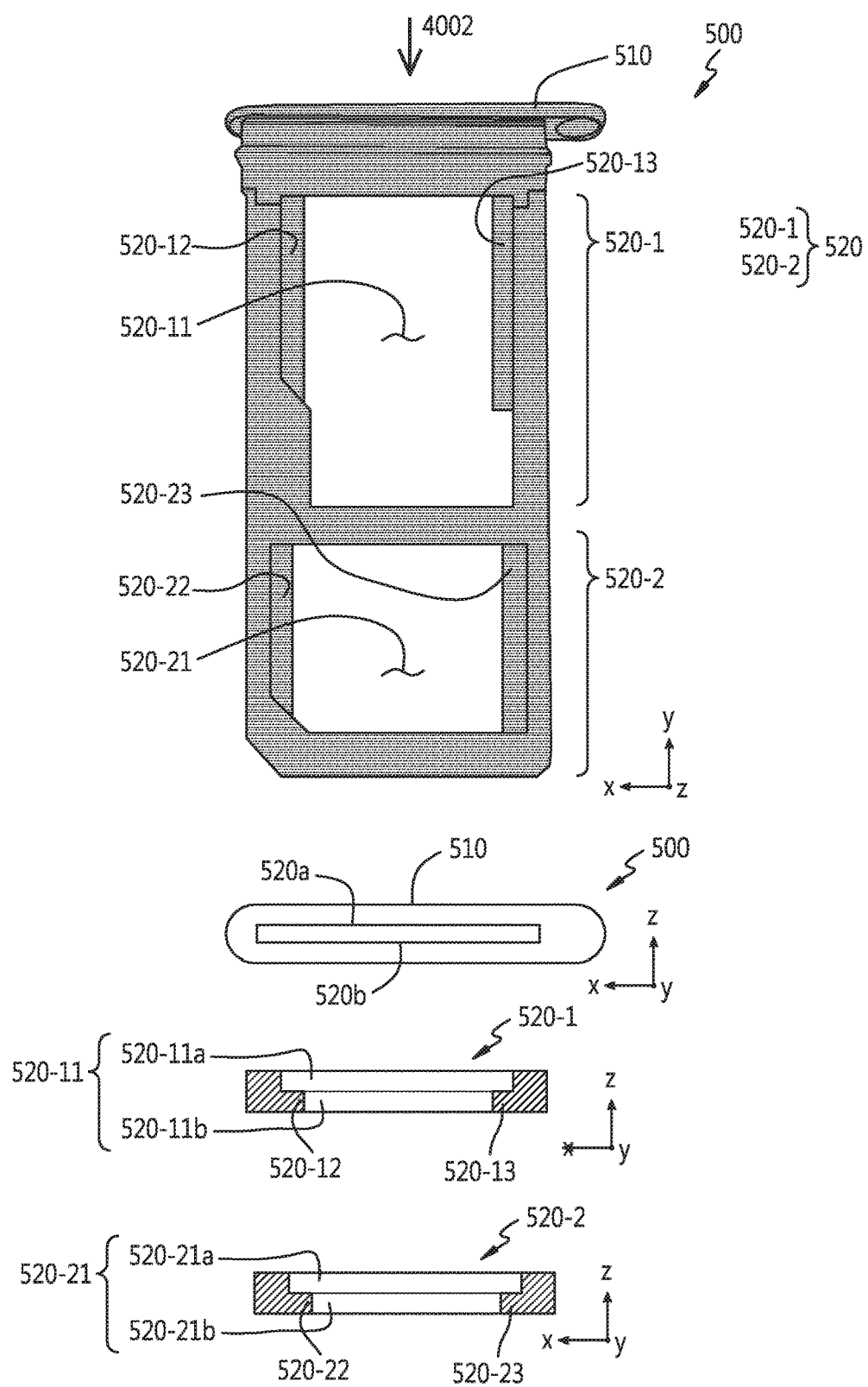
FIG. 5A illustrates a tray according to an embodiment of the present disclosure.
Figure 5B:
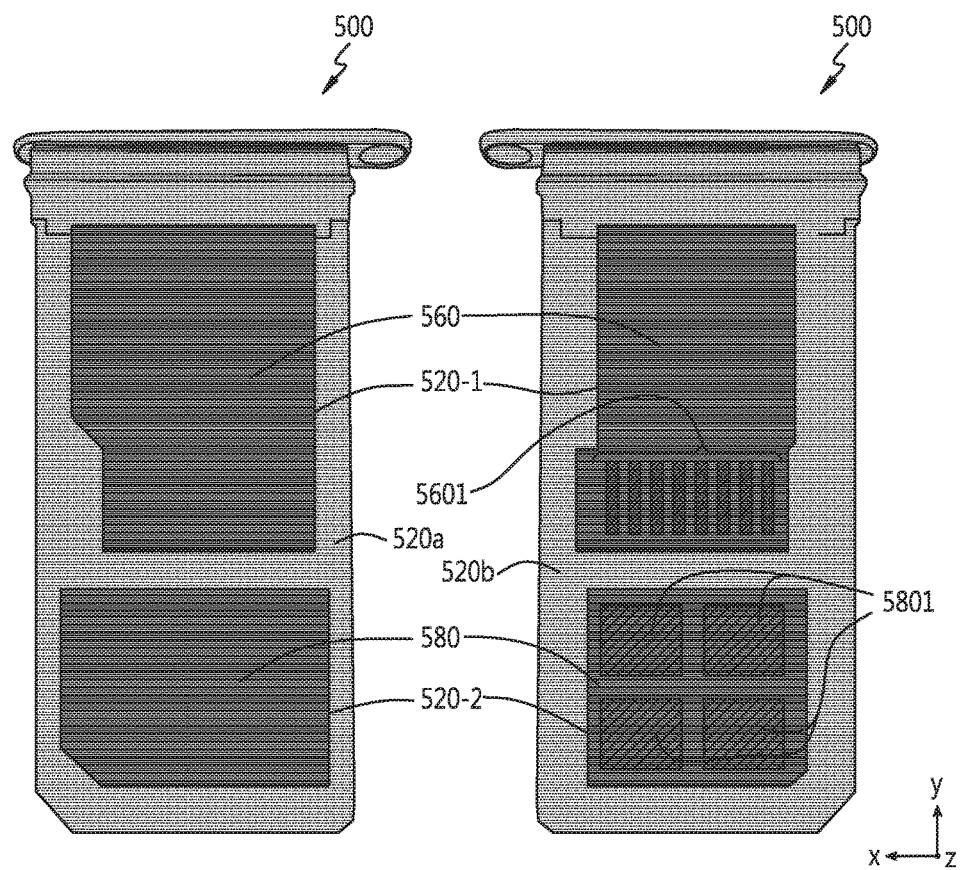
FIGS. 5B and 5C illustrate a state in which a plurality of external storage media is attached to a tray according to various embodiments of the present disclosure.
Figure 5C:
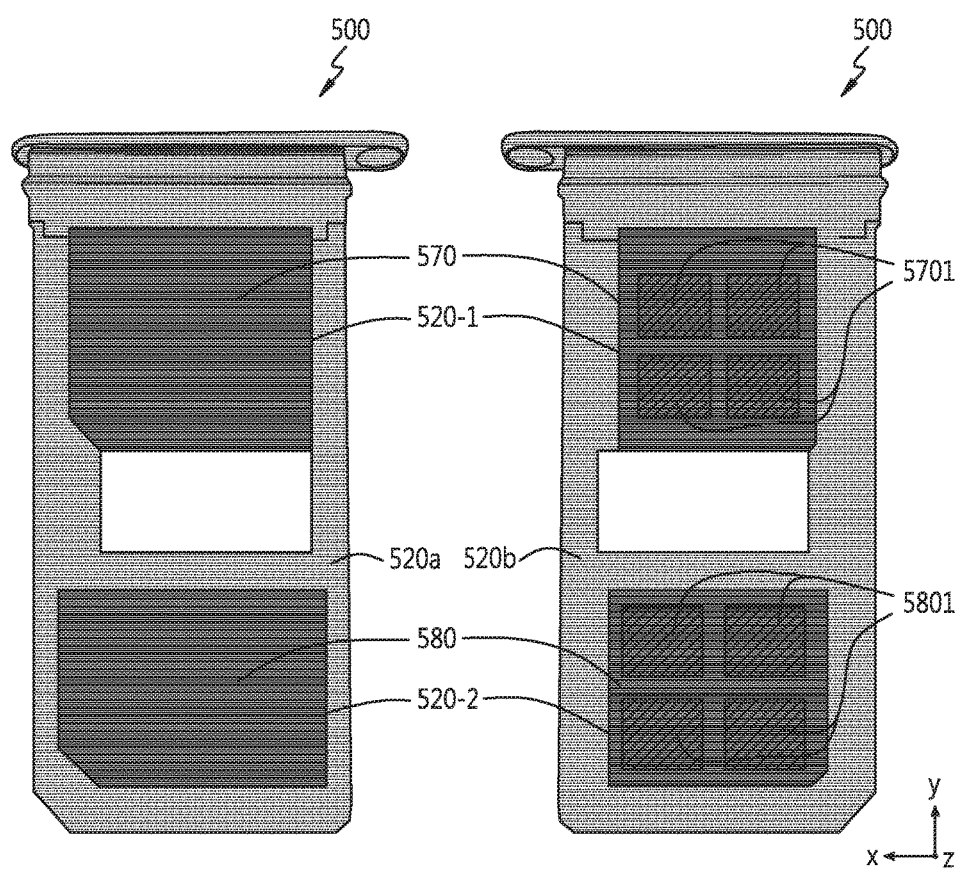

FIG. 5A illustrates a tray according to an embodiment of the present disclosure. FIGS. 5B and 5C illustrate a state in which a plurality of external storage media is attached to a tray.

Referring to FIG. 5A, the tray 500 may include a first portion 510 and a second portion 520 extended from the first portion 510. If the tray 500 is completely inserted into an electronic device (e.g., the electronic device 300 of FIG. 3A), the first portion 510 may be engaged into the through-hole 3195 of a first metal frame (i.e., the first metal frame 31-1 of FIG. 4A), and may form one part of the third surface 3100-3 of the electronic device 300. Further, if the tray 500 is completely inserted into the electronic device (e.g., the electronic device 300 of FIG. 3A), the second portion 520 of the tray 500 may be inserted into an inner space of a socket (e.g., the socket 400 of FIG. 4A).

The second portion 520 of the tray 500 may have a roughly plate shape, and may include a first surface 520*a* and a second surface 520*b* which face opposite directions. For example, if the tray 500 is inserted to the electronic device 300, the first surface 520*a* may face a first surface (e.g., the first surface 3100-1 of FIG. 3E) of the electronic device 300, and the second surface 520*b* may face a second surface (e.g., the second surface 3100-2 of FIG. 3E) of the electronic device 300.

According to one embodiment, the second portion 520 of the tray 500 may include a first external storage medium install portion 520-1 and a second external storage medium install portion 520-2. The first external storage medium install portion 520-1 and the second external storage medium install portion 520-2 may be arranged in parallel along the direction 4002 in which the tray 500 is inserted to the socket 400. For example, when the tray 500 is inserted into the socket 400, the second external storage medium install portion 520-2 may be inserted first into the socket 400 rather than the first external storage medium install portion 520-1.

According to one embodiment, a third external storage medium (not shown) or a fourth external storage medium (not shown) may be attached to the first external storage medium install portion 520-1. The second external storage medium install portion 520-2 may be attached to a second external storage medium (not shown). For example, there may be a state in which only the third external storage medium is attached to the tray 500. Alternatively, there may be a state in which only the fourth external storage medium is attached to the tray 500. Alternatively, there may be a state in which only the second external storage medium is attached to the tray 500. Alternatively, there may be a state in which the third external storage medium and the second external storage medium are attached to the tray 500. Alternatively, there may be a state in which the fourth external storage medium and the second external storage medium are attached to the tray 500.

According to one embodiment, the first external storage medium install portion 520-1 may include a through-hole 520-11. The through-hole 520-11 may have a shape in which it is penetrated in a direction from the first surface 520*a* to the second surface 520*b*. The through-hole 520-11 may include a space having a shape in which it is narrowed in the direction from the first surface 520*a* to the second surface 520*b*. For example, the through-hole 520-11 may include a first space 520-11*a* and a second space 520-11*b* which are disposed in the direction from the first surface 520*a* to the second surface 520*b*. When viewed in the direction from the first surface 520*a* to the second surface 520*b*, the second space 520-11*b* may have a narrower width than the first space 520-11*a*. The third external storage medium and the fourth external storage medium may be engaged into the first space 520-11*a* of the through-hole 520-11. Protrusions 520-12 and 520-13 may be formed due to a width difference between the first space 520-11*a* and the second space 520-11*b*. The protrusions 520-12 and 520-13 may prevent the third external storage medium or the fourth external storage medium from being deviated in the direction from the first surface 520*a* to the second surface 520*b*.

According to one embodiment, the second external storage medium install portion 520-2 may include a through-hole 520-21. The through-hole 520-21 may have a shape in which it is penetrated in the direction from the first surface 520*a* to the second surface 520*b*. The through-hole 520-21 may include a space having a shape in which it is narrowed in the direction from the first surface 520*a* to the second surface 520*b*. For example, the through-hole 520-21 may include a first space 520-21*a* and a second space 520-21*b* which are disposed in the direction from the first surface 520*a* to the second surface 520*b*. When viewed in the direction from the first surface 520*a* to the second surface 520*b*, the second space 520-21*b* may have a narrower width than the first space 520-21*a*. The second external storage medium may be engaged into the first space 520-21*a* of the through-hole 520-21. Protrusions 520-22 and 520-23 may be formed due to a width difference between the first space 520-21*a* and the second space 520-21*b*. The protrusions 520-22 and 520-23 may prevent the second external storage medium from being deviated in the direction from the first surface 520*a* to the second surface 520*b*.

Referring to FIG. 5B, a first external storage medium 560 may be attached to the first external storage medium install portion 520-1, and a second external storage medium 580 may be attached to the second external storage medium install portion 520-2. When viewed in the direction from the first surface 520*a* to the second surface 520*b*, the first external storage medium 560 may have a shape in which it is engaged roughly seamlessly into the first space 520-11*a* of the first external storage medium install portion 520-1. Alternatively, when viewed in the direction from the first surface 520*a* to the second surface 520*b*, the second external storage medium 580 may have a shape in which it is engaged roughly seamlessly into the first space 520-11*a* of the second external storage medium install portion 520-2. When viewed in the direction from the second surface 520*b* to the first surface 520*a*, a plurality of contacts 5601 of the first external storage medium 560 may be exposed through the second space 520-11*b*, and a plurality of contacts 5801 of the second external storage medium 580 may be exposed through the second space 520-21*b*.

According to one embodiment, when the tray 500 to which the plurality of external storage medium illustrated in FIG. 5B are attached is moved to be attached to a socket (e.g., the socket 400 of FIG. 4C) or to be detached from the socket 400, at least one of the plurality of contacts 5801 of the second external storage medium 580 may be electrically connected to at least one of the plurality of first contacts 430-11 and/or at least one of the plurality of third contacts 430-12. Alternatively, when the tray 500 to which the plurality of external storage medium illustrated in FIG. 5B are attached is moved to be attached to the socket (e.g., the socket 400 of FIG. 4C) or to be detached from the socket 400, at least one of the plurality of contacts 5601 of the first external storage medium 560 may be electrically connected to at least one of the plurality of second contacts 430-12 of the socket 400. This may be triggered from an arrangement relation in which at least one of the plurality of first contacts 430-11 and at least one of the plurality of third contacts 430-12 are arranged on a virtual straight line when viewed in the direction 4002 in which the tray 500 is inserted into the socket 400. Alternatively, this may be triggered from an arrangement relation in which at least one of the plurality of third contacts 430-12 and at least one of the plurality of second contacts 430-2 are arranged on a virtual straight line when viewed from the direction 4002 in which the tray 500 is inserted to the socket 400. Alternatively, this may be triggered from an arrangement relation in which at least one of the plurality of first contacts 430-11 and at least one of the plurality of second contacts 430-2 are arranged on a virtual straight line when viewed from the direction 4002 in which the tray 500 is inserted to the socket 400.

If the tray 500 to which the plurality of external storage medium illustrated in FIG. 5B are attached is completely inserted to the socket (e.g., the socket 400 of FIG. 4C), the plurality of contacts 5601 of the first external storage medium 560 may be electrically connected to a plurality of third contacts (e.g., the plurality of third contacts 430-12 of FIG. 4D) of the socket 400, and the plurality of contacts 5801 of the second external storage medium 580 may be electrically connected to a plurality of second contacts (e.g., the plurality of second contacts 430-2 of FIG. 4D) of the socket 400.

Referring to FIG. 5C, a third external storage medium 570 may be attached to the first external storage medium install portion 520-1, and the second external storage medium 580 may be attached to the second external storage medium install portion 520-2. When viewed in the direction from the first surface 520a to the second surface 520b, the third external storage medium 570 may have a shape in which it is engaged into one part of the first space 520-11a of the first external storage medium install portion 520-1. Alternatively, when viewed in the direction from the first surface 520a to the second surface 520b, the second external storage medium 580 may have a shape in which it is engaged roughly seamlessly into the first space 520-11a of the second external storage medium install portion 520-2. When viewed in the direction from the second surface 520b to the first surface 520a, a plurality of contacts 5701 of the third external storage medium 570 may be exposed through the second space 520-11b, and the plurality of contacts 5801 of the second external storage medium 580 may be exposed through the second space 520-21b.

According to one embodiment, when the tray 500 to which the plurality of external storage medium illustrated in FIG. 5C are attached is moved to be attached to a socket (e.g., the socket 400 of FIG. 4C) or to be detached from the socket 400, at least one of the plurality of contacts 5801 of the second external storage medium 580 may be electrically connected to at least one of the plurality of first contacts 430-11 and/or at least one of the plurality of third contacts 430-12. This may be triggered from an arrangement relation in which a plurality of contacts among at least one of the plurality of first contacts 430-11, at least one of the plurality of third contacts 430-12, and at least one of the plurality of second contacts 430-2 are arranged on a virtual straight line when viewed in the direction 4002 in which the tray 500 is inserted into the socket 400.

If the tray 500 to which the plurality of external storage medium illustrated in FIG. 5C are attached is completely inserted into the socket (e.g., the socket 400 of FIG. 4C), the plurality of contacts 5701 of the third external storage medium 570 may be electrically connected to a plurality of first contacts (e.g., the plurality of first contacts 430-11 of FIG. 4D) of the socket 400, and the plurality of contacts 5801 of the second external storage medium 580 may be electrically connected to a plurality of second contacts (e.g., the plurality of second contacts 430-2 of FIG. 4D) of the socket 400.

As described above, when the second external storage medium 580 attached to the tray 500 is moved to be attached to the socket 400 or to be detached from the socket 400, the second external storage medium 580 may be electrically connected to a power-related contact for a different external storage medium placed on the movement. According to various embodiments, the electronic device 300 may cut off or delay power supplied to the power-related contact for the different external storage medium to prevent unintended power from being supplied to the second external storage medium, thereby preventing a data loss or a fault occurrence in the second external storage medium.

According to one embodiment of the present disclosure, when the tray 500 is completely attached to the socket 400, the electronic device 300 may supply power to the power-related contact of the plurality of first contacts 430-11 and/or the plurality of third contacts 430-12 of the socket 400, thereby preventing a data loss or a fault occurrence in the second external storage medium 580 as described above.

According to another embodiment of the present disclosure, when the tray 500 is detached from the socket 400, the electronic device 300 may cut off or delay power supplied to a power-related contact of the plurality of first contacts 430-11 and/or the plurality of third contacts 430-12 of the socket 400, thereby preventing a data loss or a fault occurrence in the second external storage medium 580 as described above. The detaching of the tray 500 may also include a state in which the tray 500 is not completely attached to the socket 400.

Figure 6:
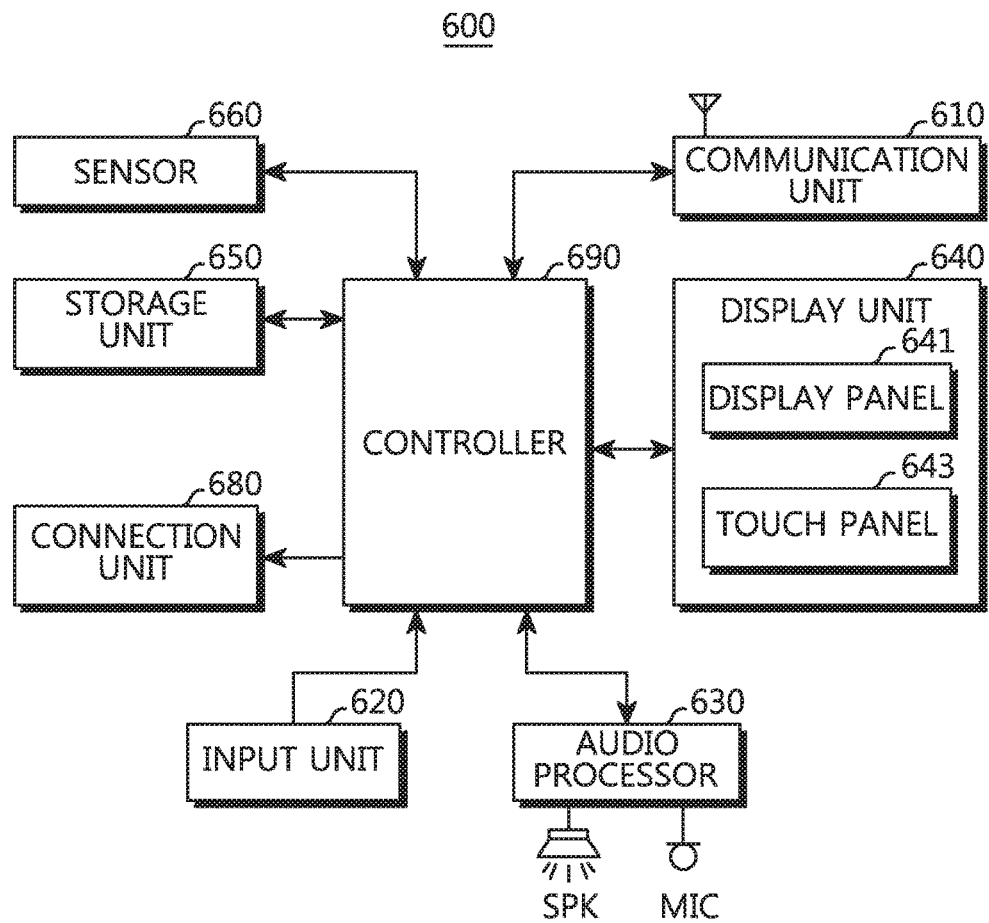
FIG. 6 is a block diagram of a device capable of mounting an external storage medium according to an embodiment of the present disclosure.

FIG. 6 is a block diagram of a device capable of mounting an external storage medium according to an embodiment of the present disclosure.

Referring to FIG. 6, an electronic device 600 according to one embodiment may include a communication unit 610, an input unit 620, an audio processor 630, a display unit 640, a storage unit 650, a sensor 660, a connection unit 680, and a controller 690.

The communication unit 610 (e.g., the communication module 220 of FIG. 2) may support a communication function of the electronic device 600. The communication unit 610 may be included, for example, when the electronic device 600 is produced in a form of a device for supporting the communication function. Accordingly, if the electronic device 600 to which the present disclosure is applicable does not support the communication function, the communication unit 610 may be omitted in the electronic device 600. The communication unit 610 may be prepared in a form of a mobile communication module to support the communication function (e.g., a mobile communication function) of the electronic device 600. The communication unit 610 may form a communication channel with the mobile communication system to support signal transmission/reception for performing the mobile communication function of the electronic device 600. For example, the communication unit 610 may form at least one of a voice service channel, a video service channel, and a data service channel with respect to the mobile communication system, and may support transmission/reception of a specific signal based on a corresponding channel.

According to one embodiment, the communication unit 610 may support a function for transmitting data acquired from at least one external storage medium electrically connected to the connection unit 680 to the outside, or for receiving the data from the outside.

According to one embodiment, the communication unit 610 may receive subscriber information for the mobile communication function from the outside.

The input unit 620 (e.g., the input unit 250 of FIG. 2) may generate various input signals capable of operating the electronic device 600. The input unit 620 may include various input means such as a keyboard, a key pad, a key button, or the like according to a compatibility of the electronic device 600.

The audio processor 630 (e.g., the audio module 280 of FIG. 2) may output a variety of audio data determined in an operation of the electronic device 600, audio data based on reproducing of an audio file stored in the storage unit 650, audio data received from the outside, or the like. Further, the audio processor 630 may support a function for collecting audio data. For this, the audio processor 630 may include a speaker (SPK) and a microphone (MIC).

According to one embodiment, the audio processor 630 may output various sound effects or voice announcements related to a state in which the external storage medium is completely attached to the connection unit 680, a state in which it is incompletely attached to the connection unit 680, or a state in which it is detached from the connection unit 680, under the control of the controller 690. Alternatively, the audio processor 630 may output various sound effects or voice announcements related to a state in which the tray (e.g., the tray 500 of FIG. 5A) is completely attached to the connection unit 680, a state in which it is incompletely attached to the connection unit 680, or a state in which it is detached from the connection unit 680, under the control of the controller 690.

The display unit 640 (e.g., the display 260 and touch panel 252 of FIG. 2) may provide various screen interfaces related to the operation of the electronic device 600. According to one embodiment, the display unit 640 may display information related to a state in which the external storage medium is completely attached to the connection unit 680, a state in which it is incompletely attached to the connection unit 680, or a state in which it is detached from the connection unit 680, under the control of the controller 690. Alternatively, the display unit 640 may display information related to a state in which the tray (e.g., the tray 500 of FIG. 5A) is completely attached to the connection unit 680, a state in which it is incompletely attached to the connection unit 680, or a state in which it is detached from the connection unit 680, under the control of the controller 690.

The display unit 640 may be prepared as a touch screen in which a display panel 641 and a touch panel 643 overlap. An image, text, or the like corresponding to various screens may be output to the display panel 641, and at least one screen interface may be output among the screen interfaces. The touch panel 643 may determine a touch-enabled area in which a touch event is normally collected according to a screen feature output to the display panel 641 and a touch-disabled area in which the collected touch event is ignored or the touch event is not collected. The touch panel 643 may deliver the touch event generated in the touch-enabled area to the controller 690.

The storage unit 650 (e.g., the memory 230 of FIG. 2) may store various basic operating systems related to the operation of the electronic device 600, and data, application programs, algorithms, or the like corresponding to various user functions. According to one embodiment, the storage unit 650 may store data acquired from at least one external storage medium electrically connected to the connection unit 680.

According to one embodiment, the storage unit 650 may store a program (or a module) executable by the controller 690. For example, when at least one external storage medium is detached from the connection unit 680 according to the program stored in the storage unit 650, the controller 690 may control (e.g., cut off or delay) power provided to at least one contact. The detaching of the external storage medium may also include a state in which the tray 500 is not completely attached to the connection unit 680. For example, when a tray (e.g., the tray 500 of FIG. 5A) is detached from the connection unit 680 according to the program stored in the storage unit 650, the controller 690 may control (e.g., cut off or delay) power provided to at least one part of the connection unit 680. The detaching of the tray 500 may also include a state in which the tray 500 is not completely attached to the connection unit 680.

The sensor 660 (e.g., the sensor module 240 of FIG. 2) may detect or distinguish and measure a physical amount of heat, light, temperature, pressure, sound, locations, or the like and a change thereof. The sensor 660 may include a temperature sensor, a pressure sensor, a magnetic sensor, an optical sensor, a sound sensor, a proximity sensor, a gravity sensor, an acceleration sensor, a gyro sensor, a fingerprint sensor, or the like. According to one embodiment, the sensor 660 may generate an input regarding that at least one external storage medium is attached to the connection unit 680 or is detached from the electronic device 600. Alternatively, the sensor 660 may generate an input regarding that a tray (e.g., the tray 500 of FIG. 5A) is attached to the connection unit 680 or is detached from the connection unit 680.

According to various embodiments, when the external storage medium is moved to be attached to the connection unit 680 or to be detached from the connection unit 680, the external storage medium may be electrically connected to a power-related contact for a different constitutional element placed on the movement. This may be triggered from an arrangement relation in which at least one contact of the external storage medium and at least one contact of the different constitutional element are arranged on a virtual straight line when viewed in a direction in which the external storage medium is inserted to the electronic device 600.

The connection unit 680 (e.g., a connection circuit) may provide various types of structures capable of attaching at least one external storage medium.

According to various embodiments, the connection unit 680 may provide various types of structures capable of simultaneously attaching a plurality of external storage media. According to one embodiment, the connection unit 680 may include the socket 400 of FIG. 4A (hereinafter, a "connection unit" and a "socket" are used interchangeably). The socket 680 may include a plurality of contacts used to electrically connect to at least one external storage medium.

According to one embodiment, the plurality of external storage media may be attached to a tray (e.g., the tray 500 of FIG. 5A). The tray 500 to which the plurality of external storage media are attached may be inserted to the socket 680. The socket 680 may include contacts electrically connectable to the plurality of external storage media. For example, the socket 680 may include a plurality of first contacts for a first external storage medium and a plurality of second contacts for a second external storage medium. When the tray (e.g., the tray 500 of FIG. 5A) to which the first external storage medium and the second external storage medium are attached is attached to the socket 680, the first external storage medium may be electrically connected to the plurality of first contacts, and the second external storage medium may be electrically connected to the plurality of second contacts.

According to various embodiments, when the first external storage medium is moved to be attached to the socket 680 or to be detached from the socket 680, the first external storage medium may be electrically connected to a power-related contact for the second external storage medium of the socket 680 placed on the movement. Alternatively, when the second external storage medium is moved to be attached to the socket 680 or to be detached from the socket 680, the second external storage medium may be electrically connected to a power-related contact for the first external storage medium of the socket 680 placed on the movement. This may be triggered from an arrangement relation in which at least one contact of the first external storage medium and at least one contact of the second external storage medium are arranged on a virtual straight line when viewed in the direction in which the second external storage medium is inserted to the socket 680.

According to one embodiment, the first external storage medium and the second external storage medium may be simultaneously attached to the socket 680.

For example, a tray (e.g., the tray 500 of FIG. 5A) may include a first external storage medium install portion capable of attaching the first external storage medium and a second external storage medium install portion capable of attaching the second external storage medium. According to one embodiment, the first external storage medium install portion and the second external storage medium install portion may be arranged in parallel along a direction in which the tray 500 is inserted to the socket 680. For example, when the tray 500 is inserted to the socket 680, the second external storage medium install portion may be first inserted to the socket 680 rather than the first external storage medium install portion.

When the tray (e.g., the tray 500 of FIG. 5A) to which the second external storage medium in the second external storage install portion is attached is moved to be attached to the socket 680 or to be detached from the socket 680, the second external storage medium may be electrically connected to a power-related contact for a different external storage medium of the socket 680 placed on the movement. This may be triggered from an arrangement relation in which a plurality of contacts of the socket 680 are arranged on a virtual straight line when viewed in the direction in which the tray 500 is inserted to the socket 680.

According to various embodiments, the electronic device may include a plurality of first contacts electrically connected to the external storage medium when the external storage medium is attached to the connection unit 680 and at least one second contact disposed around the first contacts without being electrically connected to the external storage medium. For example, the second contact may be for an external storage medium detachable from the electronic device 600 or for various types of constitutional elements. While the external storage medium us moved to be detached from the connection unit 680, the external storage medium may be electrically connected to at least one second contact (e.g., a power-related contact) placed on the movement. According to various embodiments, the electronic device 600 may be a flexible electronic device, and while the external storage medium is detached from the electronic device 600, a contact (e.g., the power-related contact) disposed to one modified part of the electronic device 600 may be physically in contact with the external storage medium.

The controller 690 may acquire a signal related to the detaching of the external storage medium from the connection unit 680. According to one embodiment, the controller 690 may acquire a signal related to the detaching of at least one external storage medium from various types of contact structures, switches, or sensors from the electronic device 600.

The controller 690 may acquire a signal related to the detaching of the tray (e.g., the tray 500 of FIG. 5A) from the socket 680. According to one embodiment, the controller 690 may include a contact (e.g., the contact 440 of FIG. 4B). When the tray 500 is detached from the socket 680, an electrification between a first contact and a second contact may be removed in the contact. Alternatively, the controller 690 may acquire a signal related to the detaching of the tray 500 from various types of contact structures, switches, or sensors from the socket 680.

According to one embodiment, when the external storage medium is detached from the electronic device 600, the controller 690 may control (e.g., cut off or delay) power provided to a power-related contact of at least one different constitutional element with which the external storage medium can be physically in contact, thereby preventing a data loss or a fault occurrence in the external storage medium.

According to one embodiment, when the external storage medium is detached from the electronic device 600, the controller 690 may control an on/off timing of power for at least one different constitutional element with which the external storage medium can be physically in contact through software adjustment, thereby preventing a data loss or a fault occurrence in the external storage medium.

According to one embodiment, when it is detected that the tray (e.g., the tray 500 of FIG. 5A) is detached from the socket 680, the controller 690 may control (e.g., cut off or delay) power provided to one part of a plurality of first contacts (e.g., the contacts 430-11 or 430-12 of FIG. 4B) and/or second contacts (e.g., the contacts 430-2 of FIG. 4B) for the first external storage medium of the socket 680, thereby preventing a data loss or a fault occurrence in the second external storage medium (e.g., the second external storage medium 580 of FIG. 5B or FIG. 5C).

According to one embodiment, when it is detected that the tray (e.g., the tray 500 of FIG. 5A) is detached from the socket 680, the controller 690 may control an on/off timing of power provided to one part (e.g., a power-related contact) of a plurality of first contacts (e.g., the contacts 430-11 or 430-12 of FIG. 4B) and/or second contacts (e.g., the contacts 430-2 of FIG. 4B) for the first external storage medium of the socket 680 through software adjustment, thereby preventing a data loss or a fault occurrence in the second external storage medium (e.g., the second external storage medium 580 of FIG. 5B or FIG. 5C).

According to one embodiment, the controller 690 may provide power to the constitutional elements (for example, the communication unit 610, the input unit 620, the audio processor 630, the display unit 640, the storage unit 650, and the sensor 660) of the electronic device 600. For example, the controller 690 may effectively manage and optimize power usage in the electronic device 600. According to a load to be processed by various constitutional elements, the controller 690 may provide control such that power based on the load is provided to each constitutional element.

The controller 690 (e.g., the processor 210 of FIG. 2) may control various signal flows for adjusting power to the socket 680 and may control an information collection, output, or the like according to one embodiment. The controller 690 may include the constitutional elements of FIG. 7.

The aforementioned electronic device 600 may further include various modules depending on the provided type. For example, the electronic device 600 may further include constitutional elements, which have not been mentioned above, such as a near-distance communication module for near-distance communication, an interface for transmission and reception of data by using a wireless communication method or a wireless communication method of the electronic device 600, an Internet communication module for performing an Internet function by communicating with an Internet network, and a digital broadcast module for receiving and replaying a digital broadcast. The constitutional elements may be modified in various manners along with the convergence trend of digital devices, and thus not all such components may be listed here, but the presently claimed disclosure may include one or a plurality of components of the same level as that of the above mentioned components in the device. Further, specific constitutional elements of the electronic device 600 according to one embodiment may not be included in the above configuration, or there can be substitution of other constitutional elements. This should be easily understood by those ordinarily skilled in the art.

According to one embodiment, the electronic device 600 may include all information communication devices, multimedia devices, and related application devices, such as a Portable Multimedia Player (PMP), a digital broadcasting player, a Personal Digital Assistant (PDA), a music player (e.g., an MP3 player), a portable game terminal, a smart phone, a notebook and handheld PC, or the like, in addition to all mobile communication terminals which operate based on communication protocols corresponding to various communication systems.

Figure 7:
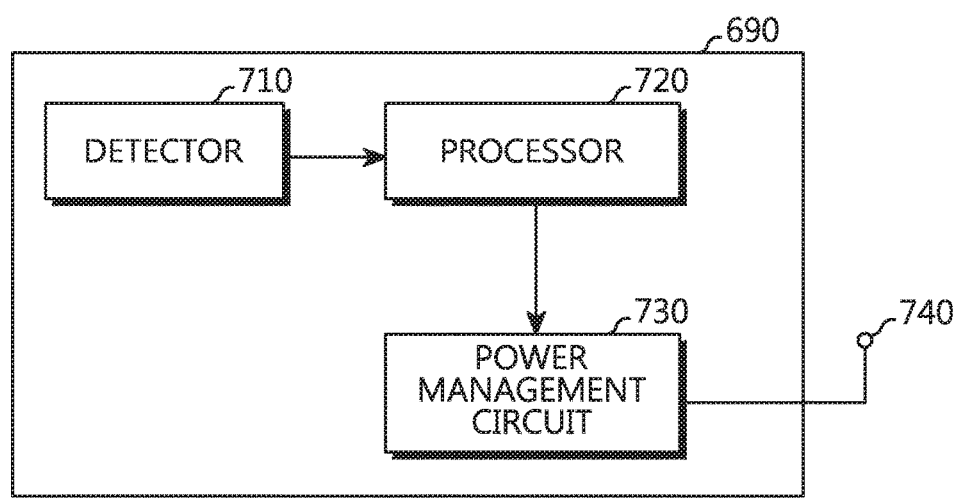
FIG. 7 illustrates a controller in greater detail according to an embodiment of the present disclosure.

FIG. 7 illustrates the controller 690 in greater detail according to an embodiment of the present disclosure.

Referring to FIG. 7, the controller 690 according to one embodiment may include a detector 710, a processor 720, and a power management circuit 730.

The detector 710 may detect that various types of external storage media attached to a socket (e.g., the socket 680 of FIG. 6) is detached from the electronic device 500 by using various types of contact structures, switches, sensors, or the like, and may deliver a signal related thereto to the processor 720. According to one embodiment, the detaching of the external storage medium may also include a state of not being completely attached (or inserted) (i.e., a state where a tray or a socket is incompletely attached).

The detector 710 may detect that a tray (e.g., the tray 500 of FIG. 5A) is detached from the socket (e.g., the socket 680 of FIG. 6), and may deliver a signal related thereto to the processor 720. According to one embodiment, the detaching of the tray 500 may also include a state of not being completely attached (or inserted) (i.e., a state where a tray or a socket is incompletely attached).

The processor 720 may receive from the detector 710 a signal related to the detaching of the external storage medium, and may deliver to the power management circuit 730 a signal for controlling power provided to at least one power-related contact.

The processor 720 may receive from the detector 710 a signal related to the detaching of the tray 500, and may deliver to the power related circuit 730 a signal for controlling power provided to the socket 680.

The power management circuit 730 may be electrically connected to a battery power source 740 and a socket (e.g., the socket 680 of FIG. 6). According to one embodiment, the power management circuit 730 may receive a signal from the processor 720, and may control (e.g., cut off or delay) power provided to at least one contact or socket 680.

According to one embodiment, when the external storage medium is moved to be attached to the electronic device 600 or to be detached from the electronic device 600, the external storage medium may be physically in contact with a power-related contact (e.g., a contact for a different external storage medium or a contact for other various constitutional elements) of a different constitutional element placed on the movement. The controller 690 may control (e.g., cut off or delay) power provided to the power-related contact for the different constitutional element to prevent unintended power from being supplied to the external storage medium, thereby preventing a data loss or a fault occurrence in the external storage medium.

According to one embodiment, when the external storage medium (e.g., the external storage medium 580 of FIG. 5B or FIG. 5C) attached to the tray 500 is moved to be attached to the socket 680 or to be detached from the socket 680, the external storage medium 580 may be electrically connected to a power-related contact for a different external storage medium placed on the movement. The controller 690 may control (e.g., cut off or delay) power provided to the power-related contact for the different external storage medium to prevent unintended power from being supplied to the external storage medium, thereby preventing a data loss or a fault occurrence in the external storage medium.

According to one embodiment, the power management circuit 730 may control power by using at least one of a PMIC, a regulator (for example, a low-dropout regulator (LDO)), a switch, and a transistor.

According to one embodiment, the power management circuit 730 may include a regulator capable of accommodating a current amount used in the socket 680. For example, the electronic device 600 may include the PMIC. The PMIC may output current by using power from a battery, and the output current may be used in various constitutional elements in the electronic device 600. In a situation where the current output from the PMIC is used by being distributed to the plurality of constitutional elements, the current amount provided to the socket 680 may be insufficient or unreliable. The regulator (e.g. LDO) may perform voltage dropping suitable for a load current change, and thus may supply the current reliably to the socket 680.

According to one embodiment, the power management circuit 730 may control an on/off timing of power provided to the at least one part of the socket 680 through software adjustment.

For example, when the external storage medium is detached from the electronic device 600, the processor 720 may deliver a delay signal to the power management circuit 730. The power management circuit 730 may delay power output to at least one contact. When the external storage medium is detached from the electronic device 600, the external storage medium may be physically in contact with a power-related contact for a different constitutional element, whereas the power management circuit 730 (e.g., various types of switches or LDOs) may delay a power output to the power-related contact to the different constitutional element in response to the delay signal from the processor 720, thereby preventing a data loss or a fault occurrence in the external storage medium. That is, when the external storage medium is detached from the electronic device 600, the power management circuit 730 may cut off abnormal current or over current which can be delivered to the external storage medium.

According to one embodiment, when the tray 500 is detached from the socket 680, the processor 720 may deliver a delay signal to the power management circuit 730. The power management circuit 730 may delay power output to at least one part of the socket 680. For example, when the tray 500 is detached from the socket 680, the second external storage medium may be physically in contact with a power-related contact for the first external storage medium, whereas the power management circuit 730 (e.g., various types of switches or LDOs) may delay a power output to the power-related contact to the first external storage medium in response to the delay signal from the processor 720, thereby preventing a data loss or a fault occurrence in the second external storage medium. That is, when the tray 500 is detached from the socket 680, the power management circuit 730 may cut off abnormal current or over current which can be delivered to the second external storage medium.

Figure 8:
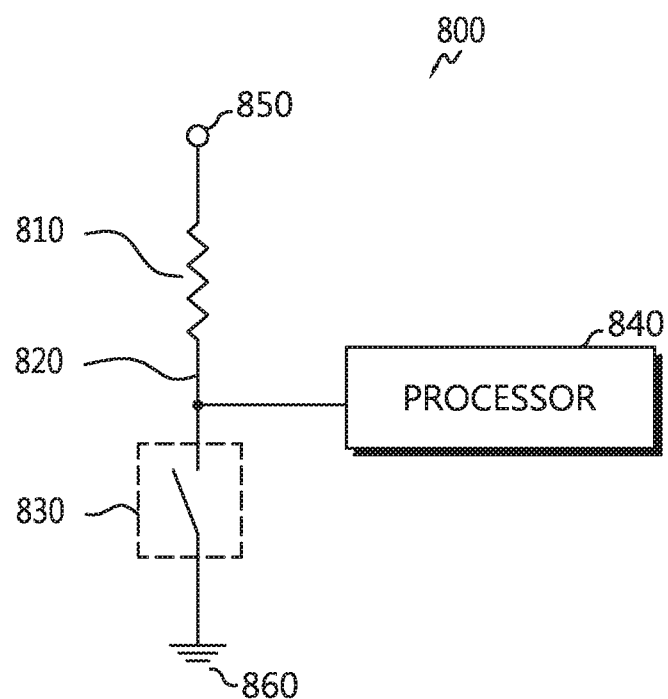
FIG. 8 illustrates a circuit of a detector according to an embodiment of the present disclosure.

FIG. 8 illustrates a circuit of a detector according to an embodiment of the present disclosure.

Referring to FIG. 8, as a circuit for a pull-up resistor, a detector 800 according to one embodiment may include a pull-up resistor 810, a connection line 820, a switch 830, and a processor 840. According to various embodiments, the detector 800 may include at least one part of the detector 710 of FIG. 7.

The pull-up resistor 810 may be connected to a battery power source 850. Alternatively, although not shown, in replacement of the battery power source 850, the pull-up resistor 810 may be connected to a power end designed in various forms.

One end of the connection line 820 may be connected to the pull-up resistor 810, and the other end may be connected to a ground 860 (e.g., the ground of the PCB 360 of FIG. 4A).

The switch 830 may be disposed to the connection line 820, and the connection line 820 may be disconnected or connected according to opening or closing of the switch 830.

The processor 840 (e.g., the processor 720 of FIG. 7) may be connected to one part of the connection line 820.

According to one embodiment, if a tray (e.g., the tray 500 of FIG. 5A) is not completely attached to a socket (e.g., the socket 680 of FIG. 6), the switch 830 may be in an open state. If the switch 830 is in the open state, the connection line 820 may be disconnected, and a high signal may be provided to the processor 840.

According to one embodiment, if the tray 500 is completely attached to the socket (e.g., the socket 680 of FIG. 6), the switch 830 may be in a close state. If the switch 830 is in the close state, the connection line 820 may be connected, and a low signal may be provided to the processor 840.

According to various embodiments, a detector (e.g., the detector 710 of FIG. 7) may include various types of circuits (not shown) in addition to the circuit exemplified in FIG. 8. For example, the detector 710 may include various types of switches or sensors (e.g., a proximity sensor, a pressure sensor, a hall sensor, etc.).

Figure 9:
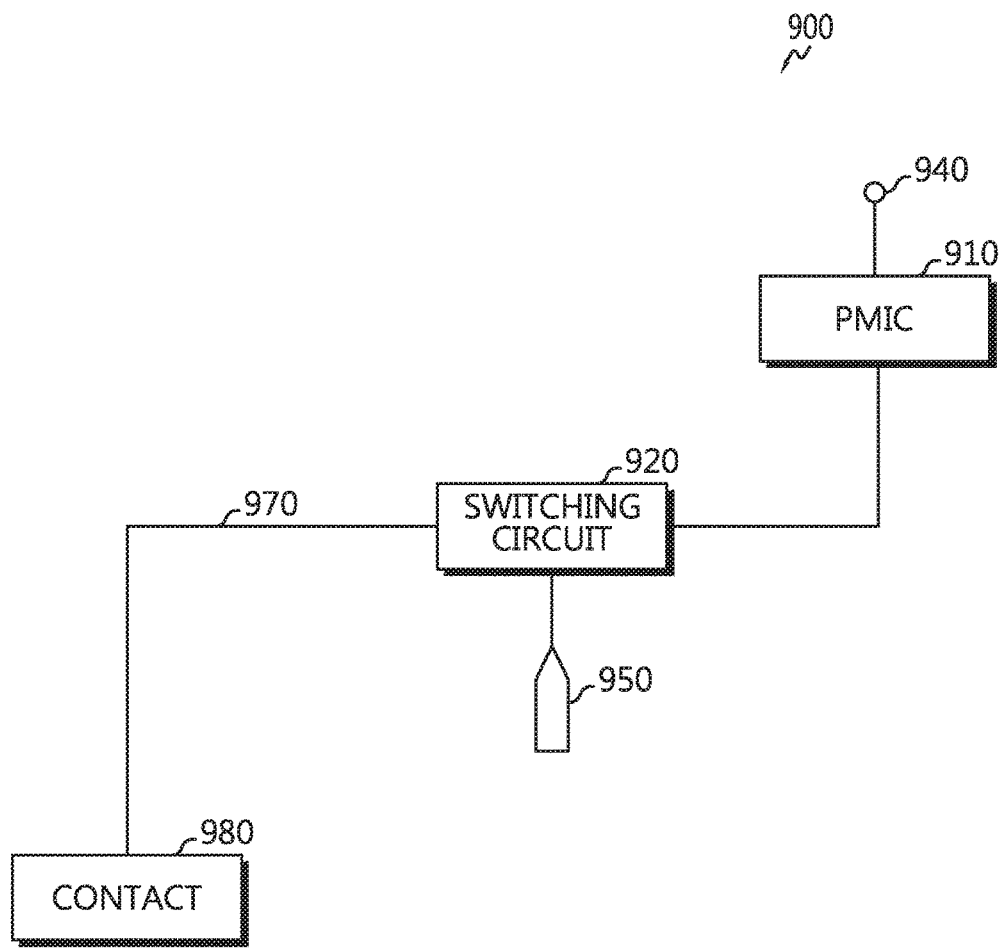
FIG. 9 illustrates a power management circuit according to an embodiment of the present disclosure.

FIG. 9 illustrates a power management circuit according to an embodiment of the present disclosure.

According to various embodiments, a power management circuit 900 may include at least one part of the power management circuit 730 of FIG. 7.

Referring to FIG. 9, the power management circuit 900 may include a Power Management Integrated Circuit (PMIC) 910 and a switching circuit 920.

The PMIC 910 may be electrically connected to a battery power source 940.

The switching circuit 920 may be mounted on a connection line 970 between the PMIC 910 and at least one contact 980. The switching circuit 920 may connect the connection line 970 between the PMIC 910 and the at least one contact 980. The PMIC 910 may adjust power capable of operating the at least one contact 980 from the battery power source 940, and may provide it to the at least one contact 980 through the connection line 970.

According to one embodiment, a processor (e.g., the processor 720 of FIG. 7) may detect that an external storage medium is detached from the electronic device 600, and may deliver a control signal 950 corresponding thereto to the switching circuit 920. The switching circuit 920 may control (e.g., cut off or delay) power provided from the PMIC 910 to at least one part of the at least one contact 980 on the basis of the control signal from the processor 720.

According to various embodiments, the at least one contact 980 may be replaced with a socket (e.g., the socket 680 of FIG. 6).

According to one embodiment, the processor (e.g., the processor 720 of FIG. 7) may detect that a tray (e.g., the tray 500 of FIG. 5A) is detached from the socket 980, and may deliver the control signal 950 corresponding thereto to the switching circuit 920. The switching circuit 920 may control (e.g., cut off or delay) power provided from the PMIC 910 to at least one part of the socket 980 on the basis of the control signal from the processor 720.

According to one embodiment, the switching circuit 920 may include a transistor. The transistor may cut off power provided from the PMIC 910 to the at least one part of the socket 980 on the basis of the control signal from the processor 720.

According to various embodiments, the switching circuit 920 may control an on/off timing of power provided to the at least one part of the socket 980 through software adjustment.

For example, when the external storage medium is detached from the electronic device 600, the processor (e.g., the processor 720 of FIG. 7) may deliver a delay signal to the switching circuit 920. When the external storage medium is detached from the electronic device 600, the external storage medium may be physically in contact with a power-related contact for a different constitutional element, whereas the switching circuit 920 may delay a power output to the power-related contact to the different constitutional element in response to the delay signal from the processor 720, thereby preventing a data loss or a fault occurrence in the external storage medium.

For example, when the tray 500 is detached from the socket 980, the processor (e.g., the processor 720 of FIG. 7) may deliver a delay signal to the switching circuit 920. The second external storage medium may be physically in contact with a power-related contact for the first external storage medium, whereas the switching circuit 920 may delay a power output to the power-related contact to the first external storage medium in response to the delay signal from the processor 720, thereby preventing a data loss or a fault occurrence in the second external storage medium.

According to one embodiment, the switching circuit 920 may be driven by using power regularly provided from the PMIC 910 or by using power periodically provided.

According to one embodiment, the switching circuit 920 may include various types of chipsets.

According to various embodiments, the PMIC 910 may include the switching circuit 920.

Figure 10:
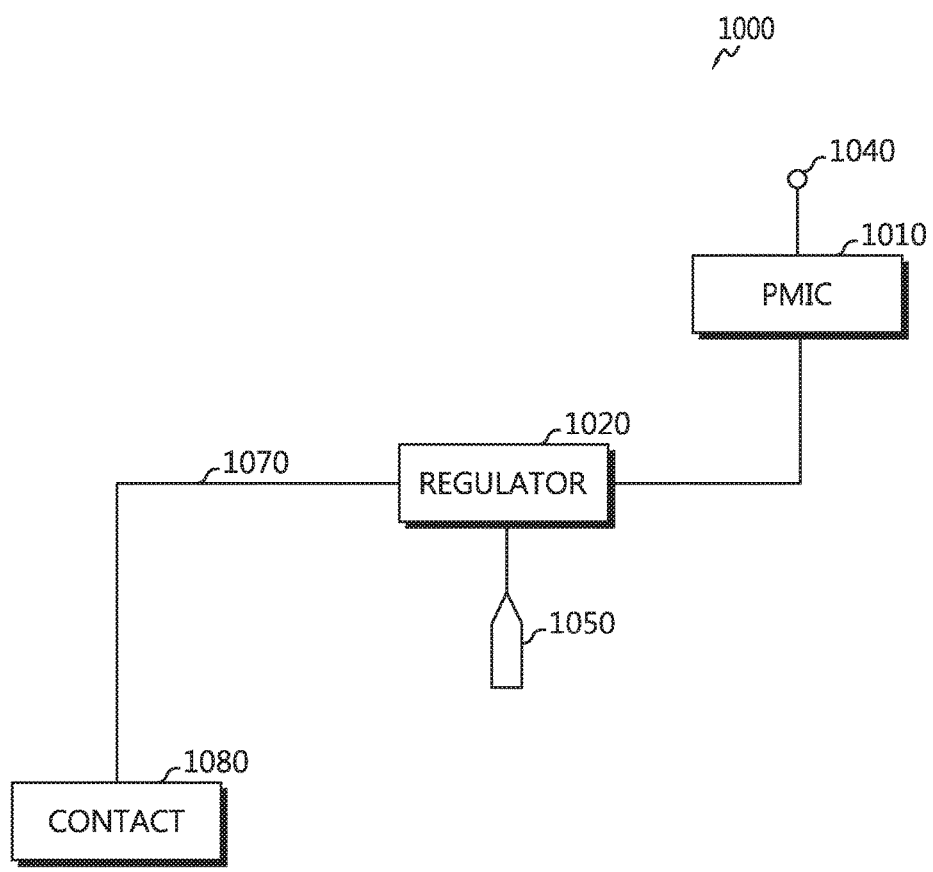
FIG. 10 illustrates a power management circuit according to an embodiment of the present disclosure.

FIG. 10 illustrates a power management circuit according to an embodiment of the present disclosure.

According to various embodiments, a power management circuit 1000 may include at least one part of the power management circuit 730 of FIG. 7.

Referring to FIG. 10, the power management circuit 1000 may include a PMIC 1010 and a regulator 1020.

The PMIC 1010 may be electrically connected to a battery power source 1040.

The regulator 1020 may be mounted on a connection line 1070 between the PMIC 1010 and at least one contact 1080. The PMIC 1010 may adjust power capable of operating the at least one contact 1080 from the battery power source 1040, and may provide it to the at least one contact 1080 through the connection line 1070.

According to one embodiment, a processor (e.g., the processor 720 of FIG. 7) may detect that an external storage medium is detached from the electronic device 600, and may deliver a control signal 1050 corresponding thereto to the regulator 1020. The regulator 1020 may control (e.g., cut off or delay) power provided from the PMIC 1010 to at least one part of the at least one contact 1080 on the basis of the control signal from the processor 720.

According to various embodiments, the at least one contact 1080 may be replaced with a socket (e.g., the socket 680 of FIG. 6).

According to one embodiment, the processor (e.g., the processor 720 of FIG. 7) may detect that a tray (e.g., the tray 500 of FIG. 5A) is detached from the socket 1080, and may deliver the control signal 1050 corresponding thereto to the regulator 1020. The regulator 1020 may control (e.g., cut off or delay) power provided from the PMIC 1010 to at least one part of the socket 1080 on the basis of the control signal from the processor 720.

According to various embodiments, the regulator 1020 may control an on/off timing of power provided to the at least one part of the socket 1080 through software adjustment.

For example, when the external storage medium is detached from the electronic device 600, the processor (e.g., the processor 720 of FIG. 7) may deliver a delay signal to the regulator 1020. The regulator 1020 may delay a power output to at least one part of the at least one contact 1080. When the external storage medium is detached from the electronic device 600, the external storage medium may be physically in contact with a power-related contact for a different constitutional element, whereas the regulator 1020 may delay a power output to the power-related contact to the different constitutional element in response to the delay signal from the processor 720, thereby preventing a data loss or a fault occurrence in the external storage medium.

For example, the processor (e.g., the processor 720 of FIG. 7) may deliver a delay signal to the regulator 1020 when the tray 500 is detached from the socket 1080. The regulator 1020 may delay a power output to at least one part of the socket 1080. When the tray 500 is detached from the socket 1080, the second external storage medium may be physically in contact with a power-related contact for the first external storage medium, whereas the regulator 1020 may delay a power output to the power-related contact to the first external storage medium in response to the delay signal from the processor 720, thereby preventing a data loss or a fault occurrence in the second external storage medium.

According to one embodiment, the regulator 1020 may include a Low Drop Out (LDO).

According to various embodiments, the PMIC 1010 may include the regulator 1020.

Figure 11:
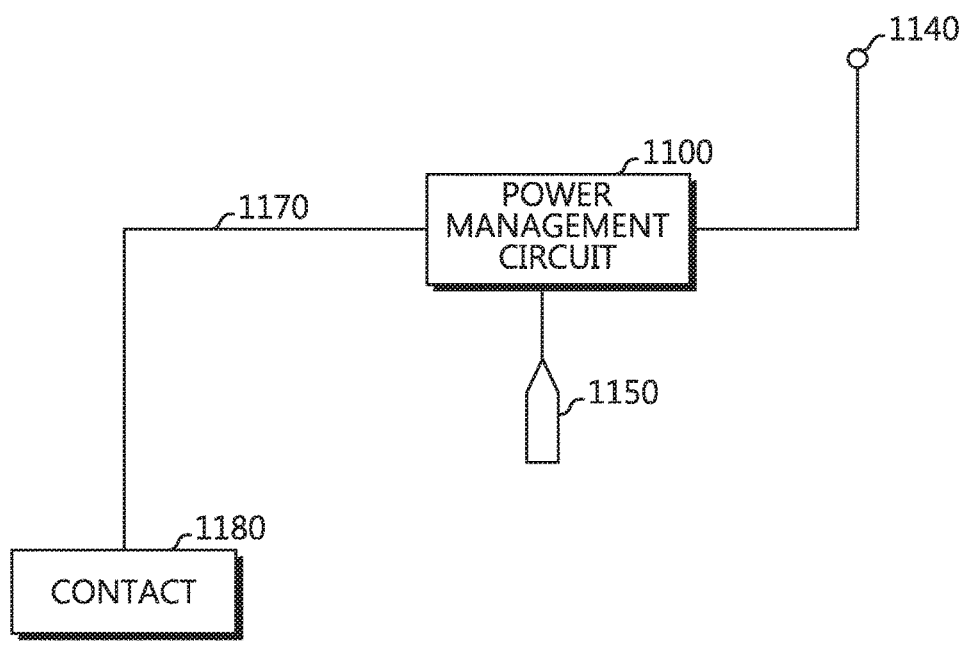
FIG. 11 illustrates a power management circuit according to an embodiment of the present disclosure.

FIG. 11 illustrates a power management circuit according to an embodiment of the present disclosure.

According to various embodiments, a power management circuit 1100 may include at least one part of the power management circuit 730 of FIG. 7.

Referring to FIG. 11, the power management circuit 1100 may be directly connected to a battery power source 1140. The power management circuit 1100 may be mounted on a connection line 1170 between the battery power source 1140 and at least one contact 1180. The power management circuit 1100 may adjust power capable of operating the at least one contact 1180 from the battery power source 1140, and may provide it to the at least one contact 1180 through the connection line 1170.

According to one embodiment, a processor (e.g., the processor 720 of FIG. 7) may detect that an external storage medium is detached from the electronic device 600, and may deliver a control signal 1150 corresponding thereto to the power management circuit 1100. The power management circuit 1100 may control (e.g., cut off or delay) power provided to at least one part of the at least one contact 1180 on the basis of the control signal from the processor 720.

According to one embodiment, the power management circuit 1100 may include at least one of a Power Management Integrated Circuit (PMIC), a Low Drop Out (LDO), a switch, and a transistor. According to various embodiments, the power management circuit 1100 may include other various types of battery power-related components.

According to various embodiments, the at least one contact 1180 may be replaced with a socket (e.g., the socket 680 of FIG. 6).

According to one embodiment, the processor (e.g., the processor 720 of FIG. 7) may detect that a tray (e.g., the tray 500 of FIG. 5A) is detached from the socket 1180, and may deliver a corresponding control signal 1150 to the power management circuit 1100. The power management circuit 1100 may cut off power provided to the at least one part of the socket 1180 on the basis of the signal from the processor 720.

According to various embodiments, the power management circuit 1100 may control an on/off timing of power provided to the at least one part of the socket 980 through software adjustment. For example, the processor (e.g., the processor 720 of FIG. 7) may deliver a delay signal to the power management circuit 1100 when the tray 500 is detached from the socket 1180. The power management circuit 1100 may delay a power output to at least one part of the socket 1180. When the tray 500 is detached from the socket 1180, the second external storage medium may be physically in contact with a power-related contact for the first external storage medium, whereas the power management circuit 1100 may delay a power output to the power-related contact to the first external storage medium in response to the delay signal from the processor 720, thereby preventing a data loss or a fault occurrence in the second external storage medium.

Figure 12:
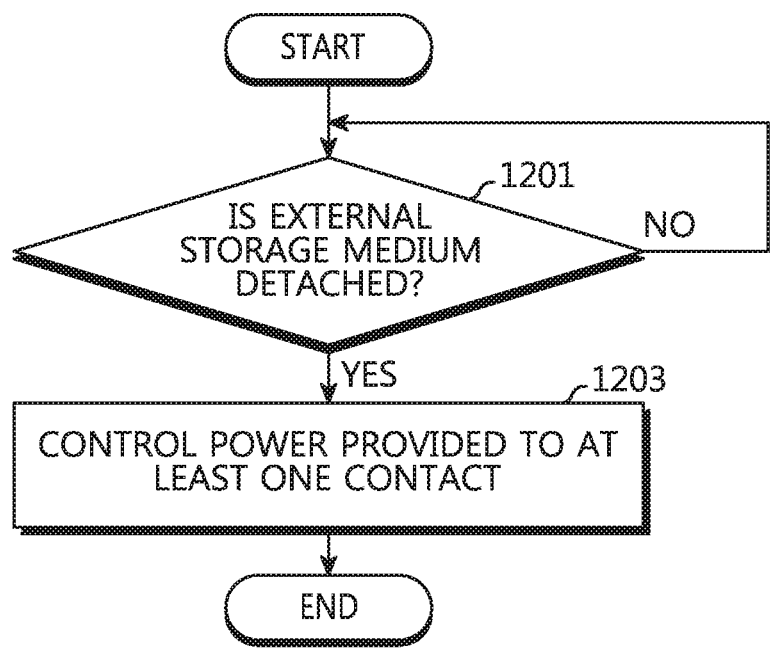
FIG. 12 is a flowchart for adjusting power provided to at least one power contact in an electronic device according to an embodiment of the present disclosure.

FIG. 12 is a flowchart for adjusting power provided to at least one power contact in an electronic device according to an embodiment of the present disclosure. According to various embodiments, the electronic device may include at least one part of the electronic device 600 of FIG. 6.

Referring to FIG. 12, when an external storage medium is detached from the electronic device 600, a controller (e.g., the controller 690 of FIG. 6) may detect this in operation 1201. According to various embodiments, the controller 690 may detect the detaching of the external storage medium by using various types of contact structures, switches, sensors (e.g., a proximity sensor, a pressure sensor, a hall sensor, etc.), or the like.

In operation 1203, the controller 690 may control power provided to at least one contact. For example, while the external storage medium is moved to be detached from the electronic device 600, the external storage medium may be physically in contact with a power-related contact (e.g., a contact for a different external storage medium or a contact for other various constitutional elements) of a different constitutional element placed on the movement. According to one embodiment, upon detection of a signal related to the detaching of the external storage medium from the electronic device 600, the controller 690 may control (e.g., cut off or delay) power provided to the power-related contact for the different constitutional element, thereby preventing a data loss or a fault occurrence in the external storage medium.

According to various embodiments, the controller 690 may control an on/off timing of power provided to the at least one contact through software adjustment. When the external storage medium is detached from the electronic device 600, the controller 690 may delay a power output to at least one part of the at least one contact. For example, when the external storage medium is detached from the electronic device 600, the external storage medium may be physically in contact with a power-related contact for a different constitutional element, whereas the controller 690 may delay a power output to the power-related contact to the different constitutional element, thereby preventing a data loss or a fault occurrence in the external storage medium.

Figure 13:
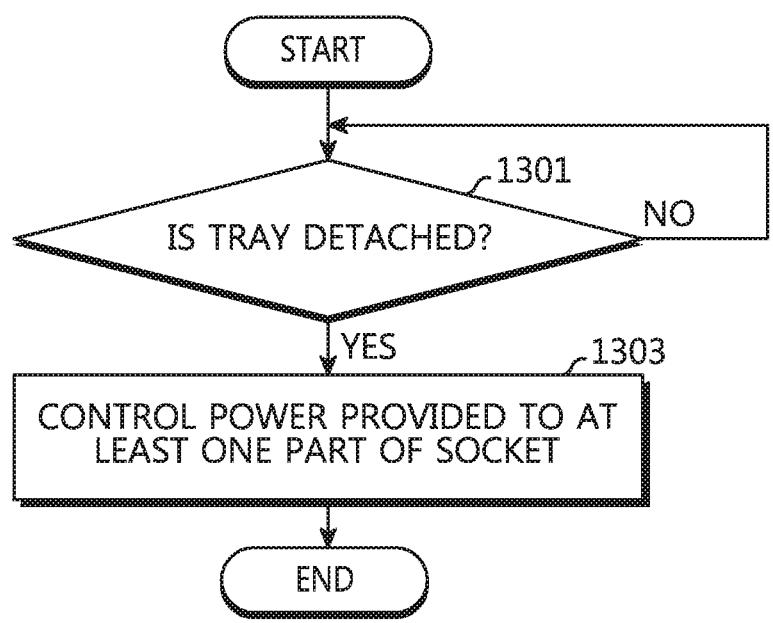
FIG. 13 is a flowchart for adjusting power provided to a socket in an electronic device according to an embodiment of the present disclosure.

FIG. 13 is a flowchart for adjusting power provided to a socket in an electronic device according to an embodiment of the present disclosure. According to various embodiments, the electronic device may include at least one part of the electronic device 600 of FIG. 6.

Referring to FIG. 13, when a tray (e.g., the tray 500 of FIG. 5A) is detached from a socket (e.g., the socket 680 of FIG. 6) of the electronic device 600, a controller (e.g., the controller 690 of FIG. 6) may detect this in operation 1301. According to one embodiment, the controller 690 may include a contact (e.g., the contact 440 of FIG. 4B). When the tray 500 is detached from the socket 680, an electrification between a first contact and a second contact may be removed in the contact. The controller 690 may acquire a signal on the basis of the removing of the electrification between the first contact and the second contact. According to various embodiments, the controller 690 may use various types of switches, sensors (e.g., a proximity sensor, a pressure sensor, a hall sensor, etc.), or the like to detect that the tray 500 is detached from the socket 680.

In operation 1303, the controller 690 may control power provided to at least one part of the socket 680. According to one embodiment, the socket 680 (e.g., the socket 400 of FIG. 4B) may have a structure capable of attaching a plurality of external storage media. The tray (e.g., the tray 500 of FIG. 5A) to which the plurality of external storage media are attached may be inserted to the socket 680. In a case where the tray (e.g., the tray 500 of FIG. 5A) to which a first external storage medium and a second external storage medium are attached is attached to the socket 680, the first external storage medium may be electrically connected to a plurality of first contacts of the socket 680, and the second external storage medium may be electrically connected to a plurality of second contacts. While the second external storage medium attached to the second external storage medium install portion of the tray (e.g., the tray 500 of FIG. 5A) is moved to be detached from the socket 680, the second external storage medium may be electrically connected to a power-related contact among contacts for the first external storage media for the socket 680 placed on the movement. According to one embodiment, upon detection of a signal related to the detaching of the tray (e.g., the tray 500 of FIG. 5A) from the socket 680, the controller 690 may cut off power provided to one part (e.g., a power-related contact) of a plurality of first contacts for the first external storage medium of the socket 680, thereby preventing a data loss or a fault occurrence in the second external storage medium.

According to an embodiment, an electronic device comprising may include a tray comprising a first external storage medium and a second external storage medium, a connection circuit comprising a plurality of first contacts configured to be electrically connected to the first external storage medium and a plurality of second contacts configured to be electrically connected to the second external storage medium when the tray is attached to the electronic device, a power management circuit configured to be electrically connected to at least one part of the connection circuit, a detector configured to detect that the tray is moved to be attached to or detached from the electronic device, and a processor electrically connected to the detector and the power management circuit, wherein the processor is configured to adjust the power management circuit to control power provided to at least one part of the plurality of first contacts or second contacts when the tray is moved to be attached to or detached from the electronic device.

According to an embodiment, the power management circuit may be configured to cut off or delay power provided to the at least one part of the plurality of first contacts or second contacts when the tray is moved to be attached to or detached from the electronic device.

According to an embodiment, the detector may comprise a contact structure or a switch that is configured to cause electricity when the tray is moved to be attached to or detached from the electronic device, or at least one sensor configured to generate a signal when the tray is moved to be attached to or detached from the electronic device.

According to an embodiment, the detector may comprise a circuit configured to receive a pull-up resistor which uses the contact structure or switch.

According to an embodiment, the power management circuit may be configured to control power using at least one of a Power Management Integrated Circuit (PMIC), a Low Drop Out (LDO) regulator, a switch, or a transistor.

According to an embodiment, the power management circuit may comprise a low drop out regulator (LDO) configured to accommodate a current usage of the connection circuit.

According to an embodiment, the power management circuit may be configured to use a software adjustment to control whether or not power is provided to one part of the connection circuit.

According to an embodiment, the first external storage medium and the second external storage medium may be arranged in a row when viewed from a direction in which the tray is configured to detach from the electronic device.

According to an embodiment, at least one part of the first contacts may be physically in contact with the second external storage medium when the tray is moved to be attached to or detached from the electronic device, or wherein at least one part of the second contacts may be physically in contact with the first external storage medium when the tray is moved to be attached to or detached from the electronic device.

According to an embodiment, when viewed from a direction in which the tray is configured to detach from the electronic device, a virtual straight line may exist between a first contact area of at least one contact among the plurality of first contacts is at least partially aligned on a virtual straight line with a second contact area of at least one contact among the plurality of second contacts, and the first contact area and the second contact may be arranged in a relatively outer side of the electronic device based.

According to an embodiment, the power management circuit may be configured to stop or delay power provided to at least one part of the plurality of first contacts when the tray is moved to be attached to or detached from the electronic device.

According to an embodiment, the electronic device may include a housing configured to form a space configured to hold the tray, and a socket configured to receive the connection circuit mounted thereon.

According to an embodiment, the second external storage medium comprises a Subscriber Identification Module (SIM) card or a Universal Subscriber Identification Module (USIM) card.

According to an embodiment, the first external storage medium may comprise a flash memory.

According to an embodiment, when the tray attached to the electronic device, the power management circuit may be configured to provide a first power for driving the first external storage medium to the plurality of first contacts, and to provide a second power for driving the second external storage medium to the plurality of second contacts.

According to an embodiment, the electronic device may include a battery electrically connected to the power management circuit.

According to various embodiments, An electronic device may include an external storage medium, a connection circuit comprising a plurality of first contacts electrically connected to the external storage medium and at least one second contact disposed around the first contacts, wherein the connection circuit is not electrically connected to the external storage medium, when the external storage medium is attached to the electronic device, a power management circuit electrically connected to at least one part of the connection circuit, a detector configured to detect that the tray is moved to be attached to or detached from the electronic device, and a processor electrically connected to the detector and the power management circuit, wherein the processor is configured to adjust the power management circuit to cut off or delay power provided to at least one part of the second contact when the tray is moved to be attached to or detached from the electronic device.

According to various embodiments, a method of operating an electronic device may include detecting that a tray is moved to be attached to or detached from the electronic device, the tray comprising a first external storage medium and a second external storage medium, and in response to the detection, controlling power provided to at least one part of the plurality of first contacts or second contacts, wherein the plurality of first contacts are configured to be electrically connected to the first external storage medium and the plurality of second contacts are configured to be electrically connected to the second external storage medium when the tray is attached to be electronic device.

According to various embodiments, wherein controlling the power provided to the least one part of the plurality of first contacts or second contacts may include cutting off or delaying power when the tray is moved to be attached to or detached from the electronic device.

According to various embodiments, wherein controlling the poser provided to the least one part of the plurality of first contact or second contacts may include, when the tray attached to the electronic device, providing a first power for driving the first external storage medium to the plurality of first contacts, and providing a second poser for driving the second external storage medium to the plurality of second contacts.

A term "module" used in the present document may imply a unit including, for example, one of hardware, software, and firmware or a combination of two or more of them. The "module" may be interchangeably used with a term such as a unit, a logic, a logical block, a component, a circuit, or the like. The "module" may be a minimum unit of an integrally constituted component or may be a part thereof. The "module" may be a minimum unit for performing one or more functions or may be a part thereof. The "module" may be mechanically or electrically implemented. For example, the "module" may include at least one of an Application-Specific Integrated Circuit (ASIC) chip, a Field-Programmable Gate Arrays (FPGAs), and a programmable-logic device, which are known or will be developed and which perform certain operations.

According to various embodiments, at least some parts of a device (e.g., modules or functions thereof) or method (e.g., operations) based on the present disclosure may be implemented, for example, with an instruction stored in a computer-readable storage medium. If the instruction is executed by one or more processors (e.g., the processor 210, the one or more processors may perform a function corresponding to the instruction. At least some parts of the programming module may be implemented (e.g., executed), for example, by the processor. At least some parts of the programming module may include modules, programs, routines, sets of instructions, processes, or the like, for performing one or more functions.

The computer readable recording medium may be a hardware device configured particularly to store and perform a program instruction (e.g., program module), for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, or the like. Further, the program instruction may include not only a machine language created by a compiler but also a high-level language executable by a computer by using an interpreter or the like. The aforementioned hardware device may be configured to operate as one or more software modules to perform the operation of the present disclosure of the present disclosure, and the other way around is also possible.

The module or programming module according to the present disclosure may further include at least one or more constitutional elements among the aforementioned constitutional elements, or may omit some of them, or may further include additional other constitutional elements. Operations performed by a module, programming module, or other constitutional elements according to the present disclosure may be executed in a sequential, parallel, repetitive, or heuristic manner. In addition, some of the operations may be executed in a different order or may be omitted, or other operations may be added.

Although the present disclosure has been described with various exemplary embodiments, various changes and modifications may be suggested to one skilled in the art. It is intended that the present disclosure encompass such changes and modifications as fall within the scope of the appended claims.

Each of constitutional elements described in the present document may consist of one or more components, and names thereof may vary depending on a type of an electronic device 101. The electronic device 101 according to various exemplary embodiments may include at least one of the constitutional elements described in the present document. Some of the constitutional elements may be omitted, or additional other constitutional elements may be further included. Further, some of the constitutional elements of the electronic device 101 according to various embodiments may be combined and constructed as one entity, so as to equally perform functions of corresponding constitutional elements before combination.

What is claimed is:

1. An electronic device comprising:
   a connection circuit comprising a plurality of first contacts configured to be electrically connected to a first external storage medium and a plurality of second contacts configured to be electrically connected to a second external storage medium when a tray is attached to the electronic device, the tray comprising a first external storage medium install portion to which the first external storage medium is attached and a second external storage medium install portion to which the second external storage medium is attached, wherein when the tray is attached to the electronic device, the second external storage medium install portion is first inserted than the first external storage medium install portion;
   a power management circuit configured to be electrically connected to at least one part of the connection circuit;
   a detector configured to detect that the tray is moved to be attached to or detached from the electronic device; and
   a processor electrically connected to the detector and the power management circuit, wherein the processor is configured to:
   adjust the power management circuit to control power provided to the plurality of first contacts when the tray is moved to be attached to or detached from the electronic device.

2. The electronic device of claim 1, wherein the power management circuit is configured to cut off or delay power provided to the plurality of first contacts when the tray is moved to be attached to or detached from the electronic device.

3. The electronic device of claim 1, wherein the detector comprises:
   a contact structure or a switch that is configured to cause electricity when the tray is moved to be attached to or detached from the electronic device, or
   at least one sensor configured to generate a signal when the tray is moved to be attached to or detached from the electronic device.

4. The electronic device of claim 3, wherein the detector comprises a circuit configured to receive a pull-up resistor which uses the contact structure or switch.

5. The electronic device of claim 1, wherein the power management circuit is configured to control power using at least one of a power management integrated circuit (PMIC), a low drop out (LDO) regulator, a switch, or a transistor.

6. The electronic device of claim 1, wherein the power management circuit comprises a low drop out regulator (LDO) configured to accommodate a current usage of the connection circuit.

7. The electronic device of claim 1, wherein the power management circuit is configured to use a software adjustment to control whether or not power is provided to one part of the connection circuit.

8. The electronic device of claim 1, wherein the first external storage medium and the second external storage medium are arranged in a row when viewed from a direction in which the tray is configured to detach from the electronic device.

9. The electronic device of claim 1, wherein at least one part of the first contacts is physically in contact with the second external storage medium when the tray is moved to be attached to or detached from the electronic device.

10. The electronic device of claim 1, wherein, when viewed from a direction in which the tray is configured to detach from the electronic device, a virtual straight line exists between a first contact area of at least one contact among the plurality of first contacts is at least partially aligned on a virtual straight line with a second contact area of at least one contact among the plurality of second contacts, and wherein the first contact area and the second contact area are arranged in a relatively outer side of the electronic device based.

11. The electronic device of claim 10, wherein the power management circuit is configured to stop or delay power provided to at least one part of the plurality of first contacts when the tray is moved to be attached to or detached from the electronic device.

12. The electronic device of claim 1, further comprising a housing configured to form a space configured to hold the tray, and a socket configured to receive the connection circuit mounted thereon.

13. The electronic device of claim 1, wherein the second external storage medium comprises a subscriber identification module (SIM) card or a universal subscriber identification module (USIM) card.

14. The electronic device of claim 1, wherein the first external storage medium comprises a flash memory.

15. The electronic device of claim 1, wherein, when the tray is attached to the electronic device, the power management circuit is configured to provide:
   a first power for driving the first external storage medium to the plurality of first contacts, and
   a second power for driving the second external storage medium to the plurality of second contacts.

16. The electronic device of claim 1, further comprising a battery electrically connected to the power management circuit.

17. A method of operating an electronic device, the method comprising:
   detecting that a tray is moved to be attached to or detached from the electronic device, the tray comprising a first external storage medium install portion to which a first external storage medium is attached and a second external storage medium install portion to which a second external storage medium is attached, wherein when the tray is attached to the electronic device, the second external storage medium install portion is first inserted than the first external storage medium install portion; and
   in response to the detection, controlling power provided to a plurality of first contacts, wherein the plurality of first contacts are configured to be electrically connected to the first external storage medium and a plurality of second contacts are configured to be electrically connected to the second external storage medium when the tray is attached to be electronic device comprising the plurality of first contacts and the plurality of second contacts.

18. The method of claim 17, wherein controlling the power provided to the plurality of first contacts or second contacts, includes cutting off or delaying power when the tray is moved to be attached to or detached from the electronic device.

19. The method of claim 17, further comprising:
when the tray attached to the electronic device, providing a first power for driving the first external storage medium to the plurality of first contacts, and providing a second poser for driving the second external storage medium to the plurality of second contacts.

* * * * *